(12) United States Patent
Wolfs et al.

(10) Patent No.: US 11,443,290 B2
(45) Date of Patent: *Sep. 13, 2022

(54) SYSTEMS AND METHODS FOR PERFORMING TRANSACTIONS USING ACTIVE AUTHENTICATION

(71) Applicant: Capital One Services, LLC, McLean, VA (US)

(72) Inventors: Rudolph Christian Wolfs, Hockessin, DE (US); David Aaron Pinski, Narberth, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,260

(22) Filed: Sep. 28, 2020

(65) Prior Publication Data

US 2021/0012303 A1 Jan. 14, 2021

Related U.S. Application Data

(63) Continuation of application No. 16/149,740, filed on Oct. 2, 2018, now Pat. No. 10,789,580, which is a continuation of application No. 13/101,759, filed on May 5, 2011, now Pat. No. 10,089,612.

(60) Provisional application No. 61/452,888, filed on Mar. 15, 2011.

(51) Int. Cl.
*G06Q 20/18* (2012.01)
*G06Q 20/20* (2012.01)
*G06Q 20/32* (2012.01)
*G06Q 20/38* (2012.01)
*G06Q 20/40* (2012.01)

(52) U.S. Cl.
CPC ............ *G06Q 20/18* (2013.01); *G06Q 20/20* (2013.01); *G06Q 20/325* (2013.01); *G06Q 20/3278* (2013.01); *G06Q 20/385* (2013.01); *G06Q 20/40* (2013.01)

(58) Field of Classification Search
None
See application file for complete search history.

(56) References Cited

U.S. PATENT DOCUMENTS 7,350,230 B2 3/2008 Forrest
7,540,408 B2 6/2009 Levine et al.
(Continued)

FOREIGN PATENT DOCUMENTS

GB 2399209 * 8/2004 ............... G07F 7/10

*Primary Examiner* — Mohammad Z Shaikh
(74) *Attorney, Agent, or Firm* — Troutman Pepper Hamilton Sanders LLP; Christopher J. Forstner; John A. Morrissett

(57) ABSTRACT

A system and method for performing a transaction at a point of sale ("POS") device includes a user device providing data indicative of a financial transaction. The data includes parameters that define the financial transaction, for example merchant name or type, transaction amount, etc. The financial institution creates an active authentication key for use in the financial transaction. Upon receiving a transaction request from the point of sale device, the financial institution can analyze the active authentication key and the parameters to determine if the transaction request should be approved.

16 Claims, 20 Drawing Sheets

(56) References Cited

U.S. PATENT DOCUMENTS

| | | | | |
|---|---|---|---|---|
| 7,562,813 | B2* | 7/2009 | Humphrey | G06Q 20/353 235/379 |
| 7,822,666 | B1 | 10/2010 | Bursch | |
| 7,865,448 | B2 | 1/2011 | Pizzaro | |
| 7,922,776 | B2* | 4/2011 | Zhang | D06M 16/003 8/185 |
| 7,992,776 | B1 | 8/2011 | Ramachandran et al. | |
| 8,052,050 | B2* | 11/2011 | Drummond | G07F 7/1008 235/382 |
| 8,632,000 | B2 | 1/2014 | Laracey | |
| 8,954,745 | B2 | 2/2015 | Cook | |
| 8,972,297 | B2 | 3/2015 | Kay et al. | |
| 9,098,846 | B2 | 8/2015 | Gill et al. | |
| 10,089,612 | B2* | 10/2018 | Wolfs | G06Q 20/20 |
| 10,108,959 | B2* | 10/2018 | Wolfs | G06Q 20/3829 |
| 10,453,062 | B2* | 10/2019 | Wolfs | G06Q 20/3829 |
| 10,789,580 | B2* | 9/2020 | Wolfs | G06Q 20/3278 |
| 11,042,877 | B2* | 6/2021 | Wolfs | G06Q 20/385 |
| 2003/0028481 | A1 | 2/2003 | Flitcroft et al. | |
| 2003/0149662 | A1 | 8/2003 | Shore | |
| 2003/0195859 | A1* | 10/2003 | Lawrence | G06Q 20/24 705/75 |
| 2004/0122771 | A1 | 6/2004 | Celi, Jr. et al. | |
| 2005/0077349 | A1 | 4/2005 | Bonalle et al. | |
| 2006/0006224 | A1 | 1/2006 | Modi | |
| 2006/0136739 | A1* | 6/2006 | Brock | H04L 63/0838 713/184 |
| 2006/0206709 | A1* | 9/2006 | Labrou | G06Q 20/18 713/167 |
| 2007/0011261 | A1 | 1/2007 | Madams et al. | |
| 2007/0124242 | A1 | 5/2007 | Reis, Jr. | |
| 2007/0020835 | A1 | 8/2007 | Cai | |
| 2007/0203835 | A1* | 8/2007 | Cai | G06Q 40/00 705/43 |
| 2007/0203850 | A1 | 8/2007 | Singh et al. | |
| 2007/0295805 | A1* | 12/2007 | Ramachandran | G06Q 20/425 235/379 |
| 2008/0040285 | A1* | 2/2008 | Wankmueller | G06Q 20/3674 705/67 |
| 2008/0046366 | A1* | 2/2008 | Bemmel | G06Q 20/3274 705/44 |
| 2008/0103984 | A1* | 5/2008 | Choe | H04L 9/3228 705/16 |
| 2008/0172340 | A1 | 7/2008 | Karlsson | |
| 2008/0189209 | A1* | 8/2008 | Loomis | G06Q 20/10 705/44 |
| 2008/0280644 | A1 | 11/2008 | Hugot | |
| 2009/0024506 | A1 | 1/2009 | Houri | |
| 2009/0063291 | A1* | 3/2009 | Robbins | G06Q 20/10 705/26.1 |
| 2009/0104888 | A1 | 4/2009 | Cox | |
| 2009/0112768 | A1 | 4/2009 | Hammad et al. | |
| 2009/0204545 | A1 | 8/2009 | Haidar | |
| 2009/0271276 | A1 | 10/2009 | Roberts | |
| 2010/0051686 | A1 | 3/2010 | Obi | |
| 2010/0059587 | A1 | 3/2010 | Miller et al. | |
| 2010/0089998 | A1 | 4/2010 | Sandstrom et al. | |
| 2010/0114773 | A1 | 5/2010 | Skowronek | |
| 2010/0185860 | A1 | 7/2010 | Mishra et al. | |
| 2010/0223182 | A1 | 9/2010 | Battaglini | |
| 2011/0016047 | A1 | 1/2011 | Wu et al. | |
| 2011/0055084 | A1 | 3/2011 | Singh | |
| 2011/0078031 | A1* | 3/2011 | Mardikar | H04L 9/3228 705/17 |
| 2011/0113245 | A1* | 5/2011 | Varadarajan | G06Q 20/32 713/168 |
| 2011/0197266 | A1 | 8/2011 | Chu et al. | |
| 2011/0238573 | A1 | 9/2011 | Varadarajan | |
| 2011/0246316 | A1 | 10/2011 | Cincera | |
| 2011/0248316 | A1 | 10/2011 | Bois et al. | |
| 2012/0028609 | A1 | 2/2012 | Hruska | |
| 2012/0047070 | A1 | 2/2012 | Pharris | |
| 2012/0160912 | A1 | 6/2012 | Laracey | |
| 2012/0187187 | A1 | 7/2012 | Duff et al. | |
| 2012/0197797 | A1 | 8/2012 | Grigg et al. | |
| 2012/0239570 | A1* | 9/2012 | Wolfs | G06Q 20/3223 705/43 |
| 2012/0239572 | A1* | 9/2012 | Wolfs | G06Q 20/3278 705/44 |
| 2012/0239577 | A1* | 9/2012 | Wolfs | G06Q 20/1085 705/64 |
| 2012/0303534 | A1 | 11/2012 | Keller et al. | |
| 2013/0054469 | A1* | 2/2013 | Agashe | G06Q 20/206 705/67 |
| 2013/0275307 | A1* | 10/2013 | Khan | H04W 12/068 705/64 |

* cited by examiner

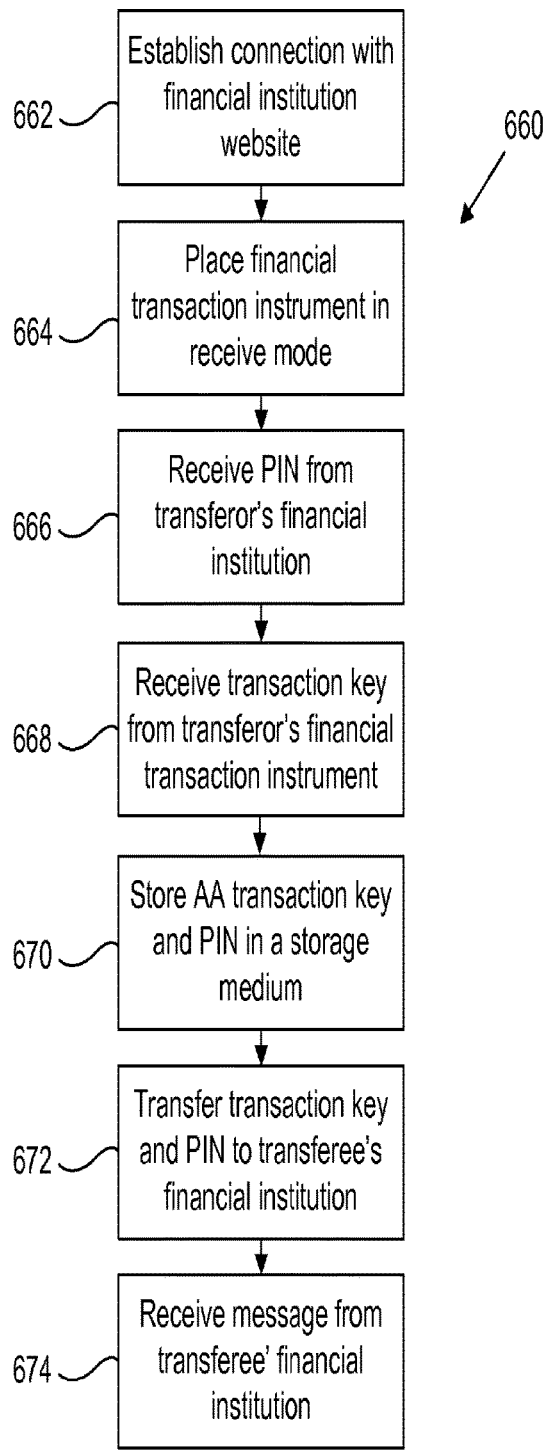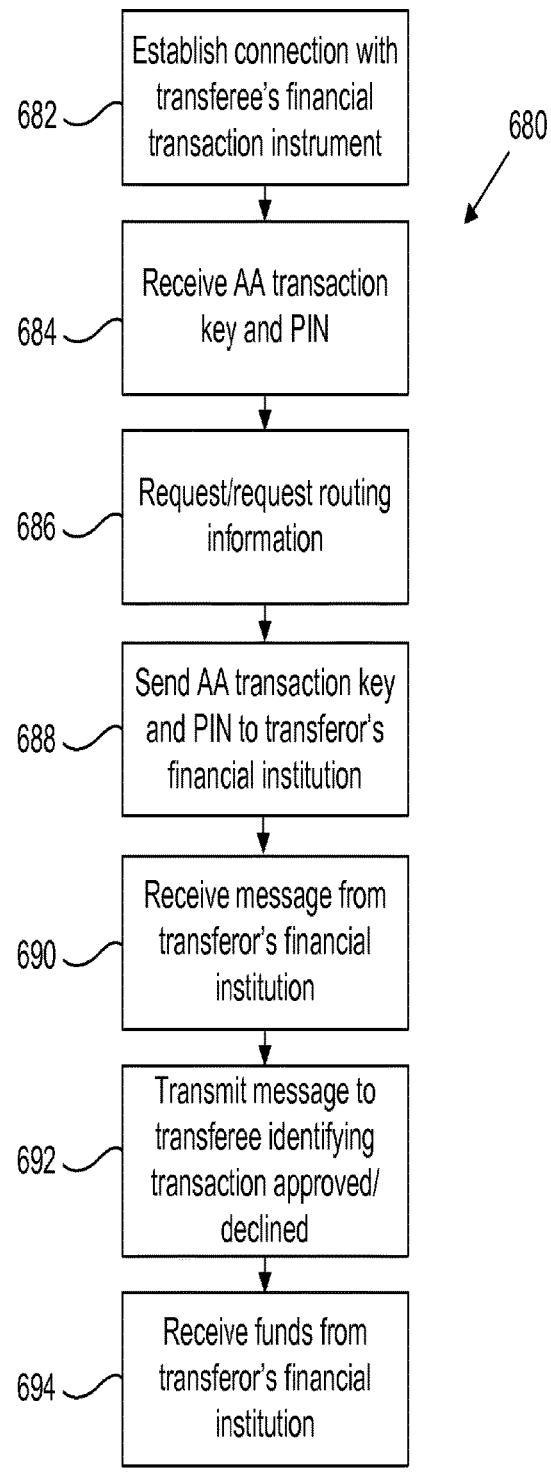
FIG. 6E
FIG. 6F

SYSTEMS AND METHODS FOR PERFORMING TRANSACTIONS USING ACTIVE AUTHENTICATION

CROSS-REFERENCE TO RELATED APPLICATIONS

This application is a continuation of, and claims priority under 35 U.S.C. § 120 to, U.S. patent application Ser. No. 16/149,740, filed 2 Oct. 2018, which is a continuation of U.S. patent application Ser. No. 13/101,759, now U.S. Pat. No. 10,089,612, filed 5 May 2011, which claims the benefit of U.S. Provisional Application No. 61/452,888, filed 15 Mar. 2011, the entire contents of which are herein incorporated by reference as if fully set forth below.

FIELD

The disclosed systems and methods relate to financial transactions. More specifically, the disclosed systems and methods relate to financial transactions in which three entities are actively engaged in authenticating a transaction.

BACKGROUND

Conventional financial transactions utilize numbers that are assigned to cards or other payment devices (e.g., fobs), then to banks, and finally to a consumer. These numbers and their keys (card verification codes) are easily stolen and manipulated. The infrastructure supporting these financial transactions was developed and built on technology from half a century ago and has not substantially evolved.

Additionally, the financial transactions involving these number-based payment devices are linear transactions that only occur between two active participants: the merchant and the financial institution. For example, when a credit card is used to pay for merchandise, the merchant transmits the credit card information to the issuing bank, which approves or declines the transaction based on a status of the account of the party presenting credit card. However, a single transaction may pass through 3 or more systems for validation. Merchant processors, aggregators, card association systems, and other systems may process data along the way, but do not take part in the authorization of the transaction. Instead, these intermediaries merely add unneeded complexity, unnecessary cost, increased processing time, and an increase in risk for a given transaction.

SUMMARY

In some embodiments, a method of performing a fund transfer at an ATM includes receiving an active authentication transaction key at an ATM from a mobile financial transaction instrument via a wireless communication protocol, generating a PIN at the ATM, and storing the PIN in a machine readable storage medium. An authorization request message is transmitted to a financial institution identified by the active authentication transaction key. The authorization request message includes the PIN and at least a portion of the active authentication transaction key. The PIN is received from a user of the mobile financial transaction instrument, and the funds are dispensed in response to receiving the PIN.

In some embodiments, a system includes a module configured to wirelessly receive an active authorization transaction key from a mobile financial transaction instrument, a non-transient machine-readable storage medium configured to store a PIN generated by the system, and a processor coupled to the module and to the non-transient machine-readable storage medium. The processor is configured to cause an authorization message to be transmitted to a financial institution identified by the active authentication transaction key and cause funds to be dispensed in response to receiving the PIN from a user of the mobile financial transaction instrument. The authorization message includes the PIN and at least a portion of the active authentication transaction key.

In some embodiments, a non-transient machine-readable storage medium is encoded with program code, wherein, when the program code is executed by a processor, the processor performs a method. The method includes causing a PIN to be generated in response to wirelessly receiving an active authentication transaction key from a mobile financial transaction instrument; causing an authorization message to be transmitted to a financial institution identified by the active authentication transaction key, and causing funds to be dispensed in response to receiving the PIN from a user of the mobile financial transaction instrument. The authorization message includes the PIN and at least a portion of the active authentication transaction key.

BRIEF DESCRIPTION OF THE DRAWINGS

These and other features and advantages of the present invention will be more fully disclosed in, or rendered obvious by the following detailed description of the preferred embodiments of the invention, which are to be considered together with the accompanying drawings wherein like numbers refer to like parts and further wherein:

FIG. 6E is a flow chart of one example of the functions performed by a transferee's mobile financial transaction instrument in accordance with the person-to-person transaction illustrated in FIGS. 6A and 6B; and FIG. 6F is a flow chart of one example of the functions performed by a transferee's financial institution in accordance with the person-to-person transaction illustrated in FIGS. 6A and 6B.

DETAILED DESCRIPTION

The disclosed systems and methods for performing financial transactions provide enhanced security compared to conventional methods by effectively eliminating the need to assign credit/debit card numbers that are specific to a mobile financial transaction instrument and an individual. Additionally, the systems and methods for performing financial transactions enable non-numeric identifiers to be utilized in financial transactions such that banks and other financial entities are not confined to the ISO/IEC 7812 numbering scheme having limited account numbers per issuer identification numbers ("IIN").

Figure 1:
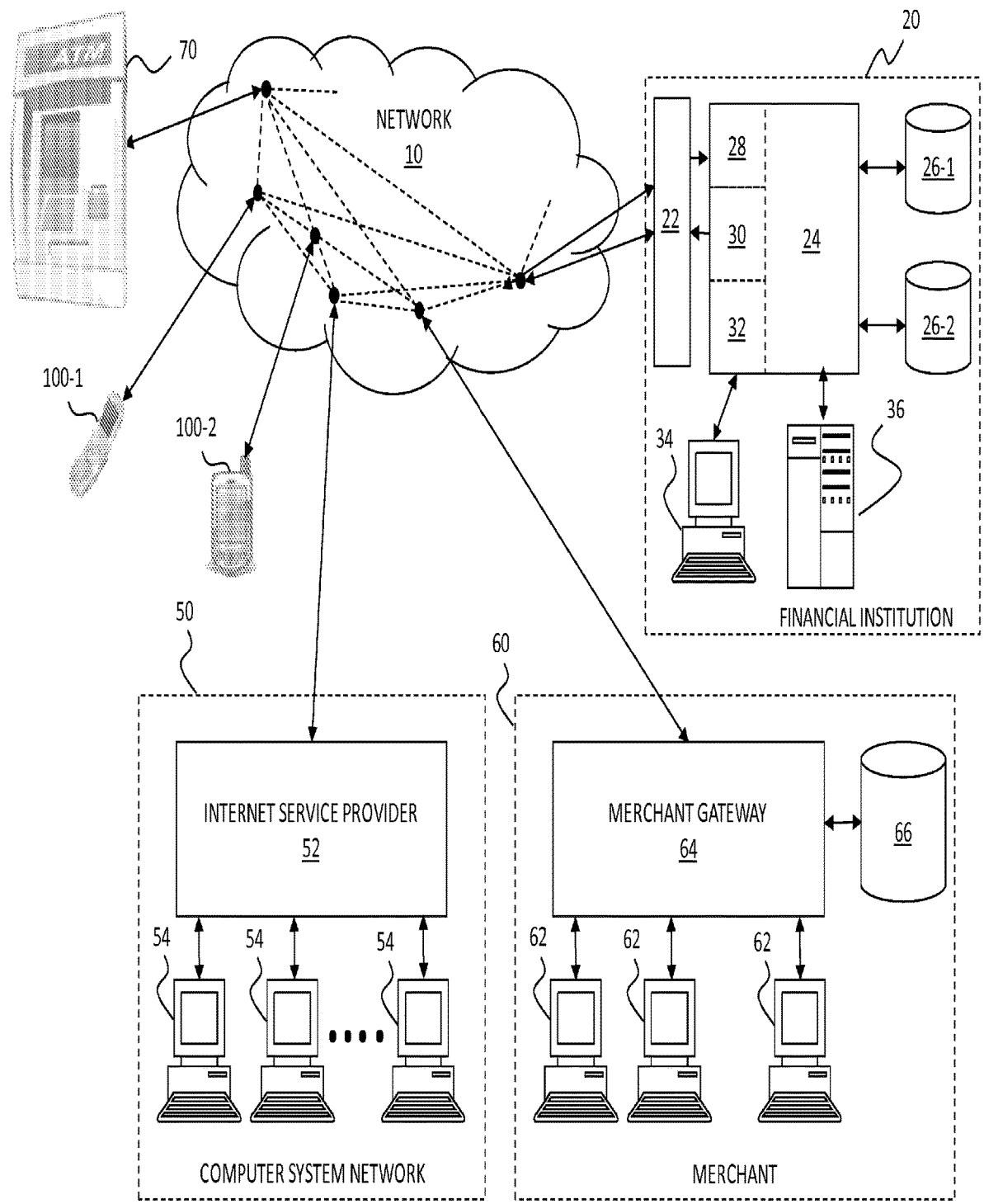
FIG. 1 is a block diagram of one example of a network for performing financial transactions.

FIG. 1 illustrates one example of a plurality of mobile financial transaction instruments 100-1, 100-2 (collectively referred to as "mobile financial transaction instruments 100") communicatively coupled to a plurality of networks and devices through network 10. Network 10 may be a wide area network ("WAN"), a local area network ("LAN"), personal area network ("PAN"), or the like. In one embodiment, network 10 is the Internet and mobile financial transaction instruments 100 are online. "Online" may mean connecting to or accessing source data or information from a location remote from other devices or networks coupled to Internet 10. Alternatively, "online" may refer to connecting or accessing an electronic network (wired or wireless) via a mobile financial transaction instrument 100 or computer 54 as described below. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

One of the most outstanding features of the Web is its use of hypertext, which is a method for cross-referencing. In most Web sites, certain words or phrases appear in text of a different color than the surrounding text. This text is often also underlined. Sometimes, there are hot spots, such as buttons, images, or portions of images that are "clickable." Clicking on hypertext or a hot spot causes the downloading of another web page via a protocol such as hypertext transport protocol ("HTTP"). Using the Web provides access to millions of pages of information. Web "surfing" is done with a Web browser, the most popular of which presently are Apple Safari, Microsoft Internet Explorer, and Mozilla Firefox. The appearance of a particular website may vary slightly depending on the particular browser used. Versions of browsers have "plug-ins," which provide animation, virtual reality, sound, and music. Interpreted programs (e.g., applets) may be run within the browser.

As shown in FIG. 1, financial institution ("FI") 20 is coupled to network 10 through firewall 22 that blocks network connections from the outside world to FI 20 inside the firewall. FI 20 may be a bank, credit union, or any entity that provides demand deposit accounts, issues or processes credit or debit transaction, or the like. It is also understood that firewalls are often governed by a set of rules that specify what IP addresses, ports, and even types of traffic are allowed to connect to machines inside the firewall. It is also understood that other network security defense tools may be employed as part of a defense-in-depth strategy to secure FI 20 including, but not limited to, intranet subnet partitioning, a demilitarized zone, intrusion detection or host-based intrusion prevention systems.

FI 20 also includes a processing unit 24 coupled to one or more data storage units 26-1, 26-2 (collectively referred to as "data storage units 26"). The processing unit 24 provides front-end graphical user interfaces ("GUIs"), e.g., customer GUI 28, non-customer GUI 30, and back-end GUIs 32 to a remote computer 54 or to local computer 34. The GUIs can take the form of, for example, a webpage that is displayed using a browser program local to the remote computers 54 or to local computer 34. It is understood that the FI 20 may be implemented on one or more computers 34, servers 36, or like devices. For example, FI 20 may include servers programmed or partitioned based on permitted access to data stored in data storage units 26. Front- and back-end GUIs 28, 30, 32 may be portal pages that include various content retrieved from the one or more data storage devices 26. As used herein, "portal" is not limited to general-purpose Internet portals, such as YAHOO! or GOOGLE but also includes GUIs that are of interest to specific, limited audiences and that provide the party access to a plurality of different kinds of related or unrelated information, links and tools as described below. "Webpage" and "website" may be used interchangeably herein.

Remote computers 54 may be part of a computer system network 50 and gain access to network 10 through an Internet service provider ("ISP") 52. Mobile financial transaction instruments 100 may gain access to network 10 through a wireless cellular communication network, a WAN hotspot, or through a wired or wireless connection with a computer 20 as will be understood by one skilled in the art. A merchant 60 including having a plurality of point-of-sale ("POS") terminals 62 may be connected to network 10. POS terminals 62 may be directly connected to network 10 or be connected through a gateway 64, which may be a processing device coupled to one or more data storage units 66. An automated teller machine ("ATM") 70 may also be connected to FI 20 through network 10.

In one embodiment, mobile financial transaction instrument 100 includes any mobile device capable of transmitting and receiving wireless signals. For example, a mobile financial transaction instrument may include, but is not limited to, mobile or cellular phones, personal digital assistants ("PDAs"), laptop computers, tablet computers, fobs, music players, and e-readers, to name a few possible devices. In some embodiments, a mobile financial transaction instrument 100 may be a desktop computer configured to perform financial transaction over a network such as the Internet. FIG. 1 is a block diagram of one example of an architecture of mobile financial transaction instrument 100. As shown in FIG. 1, mobile financial transaction instrument 100 may include one or more processors, such as processor(s) 102. Processor(s) 102 may be any central processing unit ("CPU"), microprocessor, micro-controller, or computational device or circuit for executing instructions and be connected to a communication infrastructure 104 (e.g., a communications bus, cross-over bar, or network). Various software embodiments are described in terms of this exemplary mobile financial transaction instrument 102. After reading this description, it will be apparent to one skilled in the art how to implement the method using mobile financial transaction instruments that include other systems or architectures.

Mobile financial transaction instrument 100 may include a display 106 that displays graphics, text, and other data received from the communication infrastructure 104 (or from a frame buffer not shown) to a user. Examples of such displays 106 include, but are not limited to, LCD screens and plasma screens, to name a few possible displays. Mobile financial transaction instrument 100 also includes a main memory 108, such as a random access ("RAM") memory, and may also include a secondary memory 110. Secondary memory 110 may include a more persistent memory such as, for example, a hard disk drive 112 and/or removable storage drive 114, representing a magnetic tape drive, an optical disk drive, or the like. Removable storage drive 114 reads from and/or writes to a removable storage unit 116 in a manner that is understood by one skilled in the art. Removable storage unit 116 represents a magnetic tape, optical disk, or the like, which may be read by and written to by removable storage drive 114. As will be understood by one skilled in the art, the removable storage unit 116 may include a tangible machine readable storage medium having stored therein computer software and/or data.

In some embodiments, secondary memory 110 may include other devices for allowing computer programs or other instructions to be loaded into mobile financial transaction instrument 100. Such devices may include, for example, a removable storage unit 118 and a corresponding interface 120. Examples of such units 118 interfaces 120 may include a removable memory chip (such as an erasable programmable read only memory ("EPROM")) programmable read only memory ("PROM")), secure digital ("SD") card and associated socket, and other removable storage units 118 and interfaces 120, which allow software and data to be transferred from the removable storage unit 118 to mobile financial transaction instrument 100.

Mobile financial transaction instrument 100 may also include a speaker 122, a camera 124, a microphone 126, and an input device 128. Examples of input device 128 include, but are not limited to, a keyboard, buttons, a trackball, or any other interface or device through a user may input data. In some embodiment, input device 128 and display 106 are integrated into the same device. For example, display 106 and input device 128 may be touch screen through which a user uses a finger, pen, or stylus to input data into mobile financial transaction instrument 100.

Mobile financial transaction instrument 100 also include one or more communication interfaces 130, which allows software and data to be transferred between mobile financial transaction instrument 100 and external devices such as, for example, a point-of-sale ("POS") device, an automated teller machine ("ATM"), a computer, and other devices that may be locally or remotely connected to mobile financial transaction instrument 100. Examples of the one or more communication interfaces 130 may include, but are not limited to, a modem, a network interface (such as an Ethernet card or wireless card), a communications port, a Personal Computer Memory Card International Association ("PCMCIA") slot and card, one or more Personal Component Interconnect ("PCI") Express slot and cards, or any combination thereof. The one or more communication interfaces 130 may also include a wireless interface configured for short range communication, such as near field communication ("NFC"), Bluetooth, or other interface for communication via another wireless communication protocol.

Software and data transferred via the one or more communications interfaces 130 are in the form of signals, which may be electronic, electromagnetic, optical, or other signals capable of being received by communications interfaces 130. These signals are provided to communications interface 130 via a communications path or channel. The channel may be implemented using wire or cable, fiber optics, a telephone line, a cellular link, a radio frequency ("RF") link, or other communication channels.

In this document, the terms "non-transient computer program medium" and "non-transient computer readable medium" refer to media such as removable storage units 116, 118, or a hard disk installed in hard disk drive 112. These computer program products provide software to mobile financial transaction instrument 100. Computer programs (also referred to as "computer control logic") may be stored in main memory 108 and/or secondary memory 110. Computer programs may also be received via the one or more communications interfaces 130. Such computer programs, when executed by a processor(s) 102, enable the mobile financial transaction instrument 100 to perform the features of the method discussed herein.

In an embodiment where the method is implemented using software, the software may be stored in a computer program product and loaded into mobile financial transaction instrument 100 using removable storage drive 114, hard drive 112, and/or communications interface 130. The software, when executed by a processor(s) 102, causes the processor(s) 102 to perform the functions of the method described herein. In another embodiment, the method is implemented primarily in hardware using, for example, hardware components such as application specific integrated circuits ("ASICs"). Implementation of the hardware state machine so as to perform the functions described herein will be understood by persons skilled in the art. In yet another embodiment, the method is implemented using a combination of both hardware and software.

Figure 2:
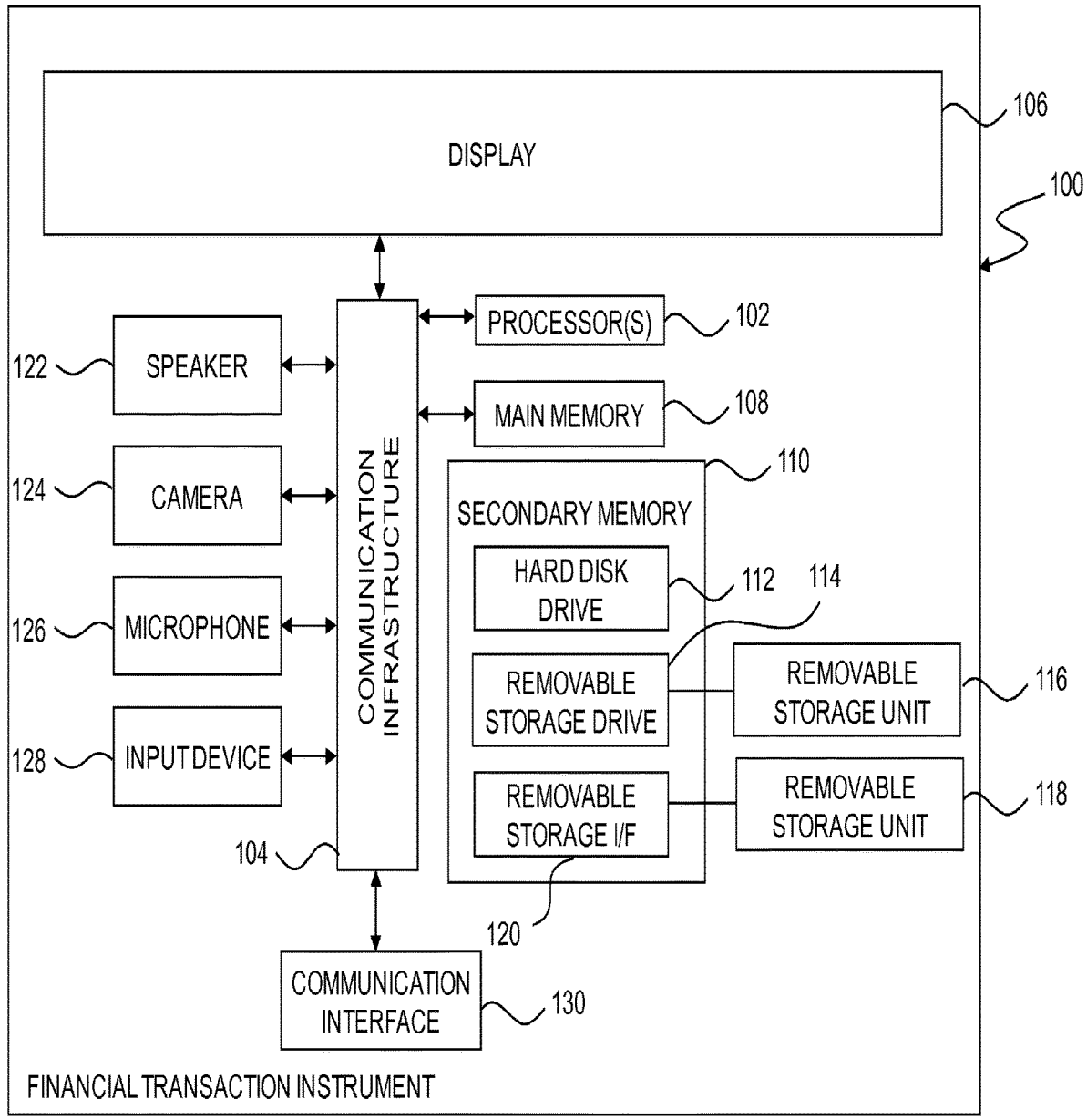
FIG. 2 is one example of an architecture of a mobile financial transaction instrument for performing financial transactions.

One skilled in the art will understand that computers 34 and 54, server 36, POS devices 62, and ATM 70 (collectively referred to as "computing devices") may have a similar architecture to the mobile financial transaction instruments 100 illustrated in FIG. 2. For example, the computing devices may include one or more processors 102, a communication infrastructure 104, a display 106, main and/or secondary memories 108, 110, a speaker 122, a camera 124, a microphone 126, an input device 128, and one or more communication interfaces 130. In some embodiments, one or more of the computing devices may have a different architecture than the mobile financial transaction instrument 100 illustrated in FIG. 2. For example, one or more of the computing devices may include each of the functional components illustrated in FIG. 2 except for speaker 122, camera 124, and/or microphone 126.

A user may gain access to financial institution 20 by using a device 34, 54, 100 programmed with a Web browser or other software, to locate and select (such as by clicking with a mouse) a particular webpage. The content of the webpage is located on the one or more data storage devices 26. Devices 34, 54 may be microprocessor-based computers that can communicate through the Internet using the Internet Protocol (IP), Kiosks with Internet access, connected personal digital assistants or PDAs (e.g., a PALM device manufactured by Palm, Inc., IPAQ device available from Compaq, iPhone from Apple or Blackberry from Research In Motion), or other devices capable of interactive network communications, such as an electronic personal planner.

The system and method described herein may be implemented by utilizing at least a part of the network described above in connection with FIG. 1. It should be apparent to one of ordinary skill in the art that the system may be incorporated in a LAN, in a WAN, or through an Internet 10 based approach, such as through a hosted or non-hosted application service, or through a combination thereof. The functionality of the method may be programmed and executed by at least one computer processor unit 24, with necessary data and graphical interface pages as described below stored in and retrieved from a data storage unit 26. A party can access this functionality using a device 34, 54, 100. As mentioned above, FI 20 may provide separate features and functionality for front-end users, such as customers and non-customers, and back-end users that manage the FI 20.

Figure 3A:
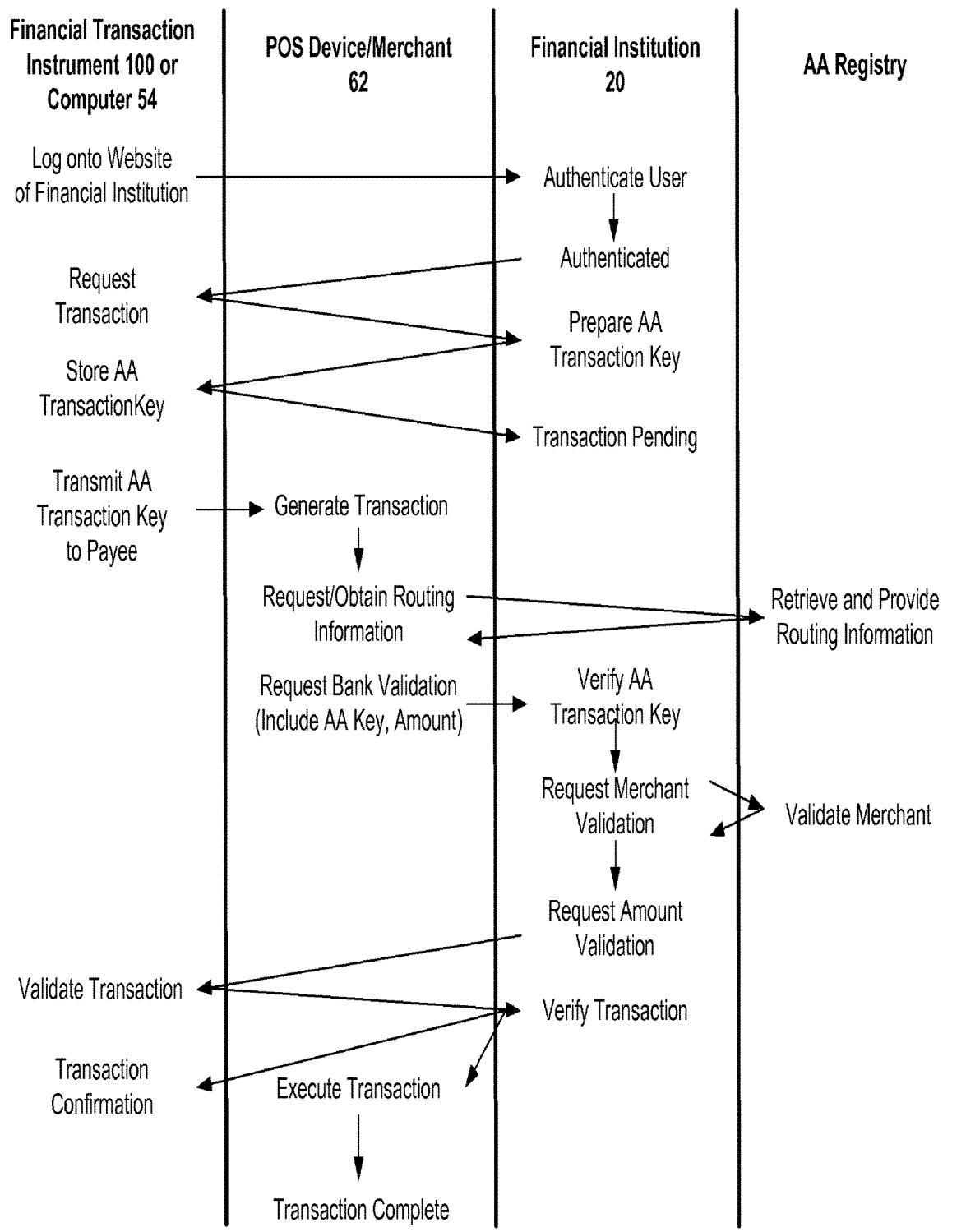
FIG. 3A is a flow chart of one example of a dynamic or active authentication method.

FIGS. 3A-3D illustrate one example of an active authentication ("AA") method. Referring first to FIG. 3A, which is a flow chart of a financial transaction using an improved AA method, the financial transaction begins with a user logging onto the website of a FI 20. In some embodiments, the user may access the website using mobile financial transaction instrument 100 or a computer 54. In some embodiments, the user may access a website of the FI 20 via an application that has been downloaded and installed on mobile financial transaction instrument 100.

Mobile financial transaction instrument 100 or computer 54 establishes a connection with server 36 on which the F1's website resides using HTTP secure ("HTTPS") or other encrypted communication protocol. The F1's website may authenticate the user based on data received from mobile financial transaction instrument 100 or computers 34, 54. Such data may include a customer number or user name and password that the user inputs into a GUI 28 displayed on display 106 using an input device 128 as will be understood by those skilled in the art.

Once the customer number or user name and password are authenticated by FI 20, a message is transmitted via HTTPS or other encryption communication protocol to mobile financial transaction instrument 100 or computer 54. The message may be displayed in a GUI 28 that on display 106 of input device 128 or computer 54 that provides a user with one or more editable fields or input buttons. For example, the GUI displayed to the user may enable the user to identify various parameters concerning an upcoming financial transaction. Examples of such data that a user may enter may include, but not be limited to, a name of a merchant, a type of merchant (e.g., a clothing store, a food store, a gas station, movie theater, etc.), a location of the merchant, a period of time during which the transaction is to be executed (e.g., next ten minutes, next two hours, next five days, etc.), a type of transaction (e.g., credit, debit, etc.), and a maximum authorized amount, to name a few potential parameters.

Once the user has entered the parameters for the financial transaction, the data entered by the user are transmitted to FI 20. FI 20 receives the parameters of the financial transaction from the mobile financial transaction instrument 100 or computer 54 and prepares an AA transaction key that is unique for the transaction and is valid for a limited period of time. In some embodiments, the transaction key is configured such that the key is compatible with existing financial transaction systems. For example, the single-use AA transaction keys may include 16-20 individual value positions in which the first several (e.g., 2, 3, etc.) positions identify the financial institution that issued the transaction key and the remaining characters identify the transaction. However, one skilled in the art will understand that the AA transaction key may include fewer or more values.

The AA transaction keys may be alpha numeric such that the transaction key is distinguishable from legacy credit card numbers that only utilize numbers. Such AA transaction keys that are generated on a per-transaction basis, are valid for a limited amount of time, and do not include static identifiers that identify an account of a user (e.g., a static credit card number) provide enhanced security compared to conventional card verification values ("CVV") and card verification codes ("CVC"). For example, CVV and CVC are pseudorandom numbers that provide additional layers of security on top of the existing credit card infrastructure and cannot be used to perform a financial transaction without being accompanied by a static credit card or account number. In contrast, the AA transaction key is a random alpha-numeric string that does not include any personal account information that may be misappropriated and used at a later time for a fraudulent transaction. Consequently, financial transactions performed using AA transaction keys do not need to be highly encrypted since the AA transaction keys have limited value and cannot be repeatedly used to perform unauthorized and/or fraudulent transactions. A copy of the AA transaction key may be locally or remotely stored by FI 20 in a data storage unit 26 for later use as described below.

The manner in which a financial institution generates an AA transaction key may differ from the manner in which other financial institutions generate the AA transactions keys. For example, some financial institutions may generate AA transaction keys that have one or more portions include data that either identifies or is based on a user's account with the institution. The one or more portions of the AA transaction key that identifies or is based on a user's account may be confidential with respect to the financial institution that generates the AA transaction, and the location of the user account information or user account-based data in the AA transaction key may vary from one financial institution to another. For example, some financial institutions may include the identification data after the prefix, some financial institutions may include the identification data at the end or in the middle of the alpha-numeric string, and some financial institutions may intersperse the identification data at certain locations throughout the alpha-numeric string.

FI 20 forwards a copy of the AA transaction key to mobile financial transaction instrument 100 or to computer 54 where it is stored in a computer readable storage medium such as main memory 108 or secondary memory 110. Mobile financial transaction instrument 100 or computer 54 transmits a message to FI 20 once the unique transaction key for the financial transaction has been stored by mobile financial transaction instrument 100 or computer 54 at which point the financial transaction is pending.

In embodiments in which the financial transaction is to be performed at a brick-and-mortar merchant 60, a user approaches a POS device 62 at a merchant 60 at some time after the financial transaction has been setup. POS device 62 may be a terminal configured to perform contactless transactions by sending and receiving data using NFC, Bluetooth, or through other wireless communication protocols. In one embodiment, items selected from the shelves of a merchant are scanned by the user or an employee of the merchant. A user places mobile financial transaction instrument 100 near POS device 62, which transfers the stored unique financial transaction key from mobile financial transaction instrument 100 to POS device 62.

In embodiments in which the financial transaction is performed at an online merchant 60, then the user clicks a check-out or other button displayed on a GUI displayed on display 106 of computer 54. The GUI may present the user with the ability to select the method by which the user will pay for goods or services. The user may select an active authentication option that causes the stored AA transaction key to be transmitted to merchant 60.

Merchant 60 or POS device 62 transmits a message including the unique transaction key directly to FI 20. In addition to including the unique transaction key, the message transmitted from merchant 60 or POS device 62 to FI 20 may also include data provided by merchant 60 or POS device 62 such as, for example, a total transaction amount, a merchant ID, or other merchant-specific or transaction specific data as will be understood by one skilled in the art. The message from merchant 60 or POS device 62 may be transmitted to FI 20 using a closed network connection.

The routing of data from a merchant 60 to FI 20 may be implemented in a plurality of ways. In some embodiments, a new routing system (referred to herein as an "AA Registry") is used by merchant 60 and POS device 62 in order to properly route the message including the unique transaction key to the appropriate financial institution. For example, the AA Registry is configured to identify a particular financial institution based on the first several values of the unique transaction key. The AA Registry may include routing data including, but not limited to, IP addresses, routing numbers, and other data for routing messages between financial institutions 20 and merchants 60. The AA Registry may be a public registry operated by an entity that is trusted by both merchants and financial institutions. In embodiments in which the AA Registry is maintained by a trusted entity, the trusted entity may vet each entity that registers its data (e.g., company name or identification, IP address(es), etc.) with the AA Registry. In some embodiments, merchant banking data is also stored by the AA Registry. For example, an ABA routing number and account number of the merchant's financial institution may be registered with the AA Registry and used for merchant verification as described below.

In some embodiments, a public registry may not be provided, and the routing data may be locally stored at each merchant and financial institution. For example, a merchant that performs a large volume of financial transactions may exchange routing information in the form of a data table with one or more financial institutions. Regardless of the manner in which the routing data is acquired by the merchant 60 or POS device 62, merchant 60 or POS device 62 directly routes the financial transaction message to FI 20 instead of routing the message through various layers of a complicated credit card network.

FI 20 receives the message from merchant 60 or POS device 62 and extracts the embedded data including the AA transaction key. The embedded data and AA transaction key are used by FI 20 to approve or decline the transaction. In some embodiments, FI 20 may also validate merchant 60 with the AA Registry to provide enhanced security against fraud. For example, FI 20 may extract the merchant ID and IP address from which the authorization request message was received and transmit a message to AA Registry requesting confirmation that merchant 60 from which the authorization request message was received is listed in the registry and the merchant ID matches the IP address stored by the AA Registry for the merchant. If merchant 60 is not validated by the AA Registry, then FI 20 may decline the transaction and send a message to the mobile financial transaction instrument 100 of the user. If merchant 60 is validated by the AA Registry, then FI 20 may continue authorizing the transaction.

The extracted AA transaction key is used to retrieve the predetermined parameters for the financial transaction from one or more of data storage devices 26. FI 20 compares the other data included in the message received from merchant 60 or POS device 62, e.g., total amount, merchant ID or information, etc., to the parameters associated with the unique transaction key and determines if the transaction should be validated. For example, if the amount in the message received from merchant 60 or POS device 62 exceeds the maximum transaction amount received from mobile financial transaction instrument 100 or computer 54 that is stored in data storage device 26, then FI 20 may transmit a message to merchant 60 or POS device 62 identifying that the transaction has been declined. However, if the transaction amount in the message received from merchant 60 or POS device 62 is below the maximum transaction amount received from mobile financial transaction instrument 100 or computer 54 that is stored in data storage device 26, then FI 20 may authorize the transaction. FI 20 may fund the transaction via an automated clearing house ("ACH"), account transfer, or other form of fund transfer from FI 20 to merchant 60.

In some embodiments, the financial transaction may include additional steps for providing enhanced security. For example, FI 20 may be configured to transmit a validation request to mobile financial transaction instrument 100 or computer 54 upon receiving the unique transaction key from merchant 60 or POS device 62 and verifying the transaction parameters. Mobile financial transaction instrument 100 or computer 54 displays a message on display 106 requesting user to use input device 128 to approve or decline the transaction. Upon receiving the user input approving or declining the transaction, mobile financial transaction instrument 100 or computer 54 transmits the user's input to FI 20.

In response to verifying (or declining) the financial transaction either internally or by receiving the user's validation of the financial transaction, FI 20 transmits a message to merchant 60 or POS device 62 identifying if the transaction should be approved or declined. If the financial transaction is approved by FI 20 and/or the user of mobile financial transaction instrument 100, then merchant 60 or POS device 62 executes and completes the financial transaction. FI 20 may also transmit a message to mobile financial transaction instrument 100 or computer 54 identifying that the transaction has been confirmed and completed.

Figure 3B:
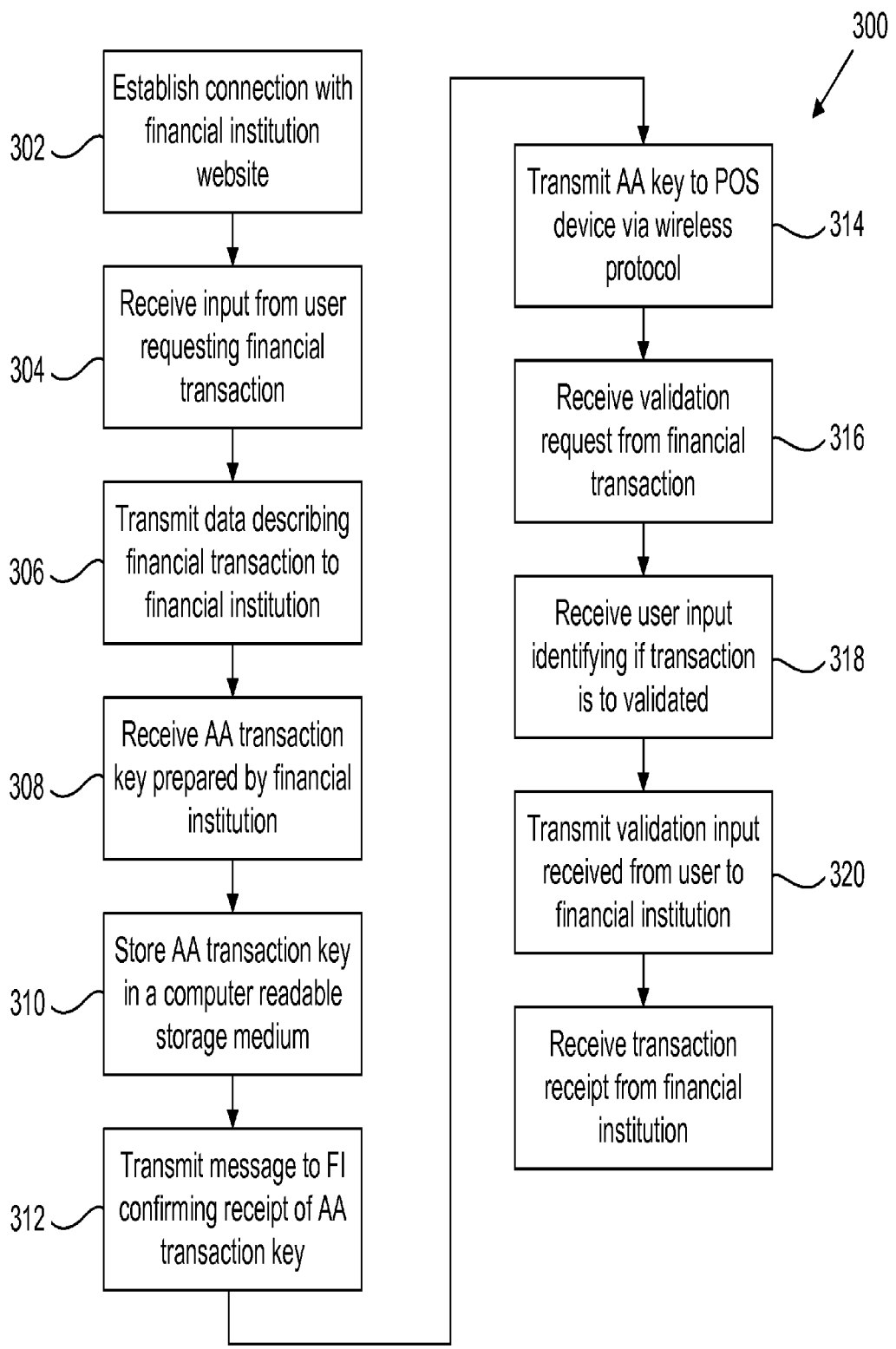
FIG. 3B is a flow chart of one example of a method performed by a mobile financial transaction instrument during a financial transaction utilizing active authentication.

A flow chart of a method 300 performed by mobile financial transaction instrument 100 during a financial transaction that utilizes active authentication are illustrated in FIG. 3B. One skilled in the art will understand that computer 54 may perform similar functions during an online transaction with a merchant 60. As shown in FIG. 3B, mobile financial transaction instrument 100 establishes a connection with a website provided by FI 20 at block 302. As described above, the connection may be established between mobile financial transaction instrument 100 and server 36 using HTTPS or another encrypted communication link. A user may access a customer portal 28 of FI 20 where the user inputs a username or customer ID along with a password. The access to the website may be provided through a browser on mobile financial transaction instrument 100 or through a mobile application that is downloaded and installed on mobile financial transaction instrument 100.

The user may use input device 128 to gain access to the appropriate GUI provided by the FI 20 for setting up a financial transaction. At block 304, mobile financial transaction instrument 100 receives the parameters of the financial transaction input by user using input device 128. As described above, the parameters of the financial transaction may include, but not be limited to, the type of transaction that is to be performed (i.e., credit, debit, or the like), a name and/or location of a merchant, and an authorized transaction amount. Mobile financial transaction instrument 100 forwards the parameters of the financial transaction to FI 20 at block 306.

At block 308, mobile financial transaction instrument 100 receives a unique AA transaction key for the financial transaction, which is stored in a computer readable storage medium at block 310. For example, mobile financial transaction instrument 100 may store the AA transaction key in main memory 108 or secondary memory 110. Mobile financial transaction instrument 100 transmits a message to FI 20 confirming receipt of the AA transaction key at block 312.

At block 314, mobile financial transaction instrument 100 transmits the stored financial transaction key to POS device 62. The transaction key may be wirelessly transmitted using NFC or other communication method. In some embodiments, mobile financial transaction instrument 100 may receive a message from FI 20 requesting the user to validate the financial transaction at block 316, and in response, mobile financial transaction instrument 100 displays the message to a user on display 106 and receives a user input from input device 128 at block 318. At block 320, mobile financial transaction instrument 100 transmits the data input by the user to FI 20 at block 320. Mobile financial transaction instrument 100 may receive a transaction receipt or message identifying that the transaction is complete from FI 20 and/or POS device 62 at block 322.

Figure 3C:
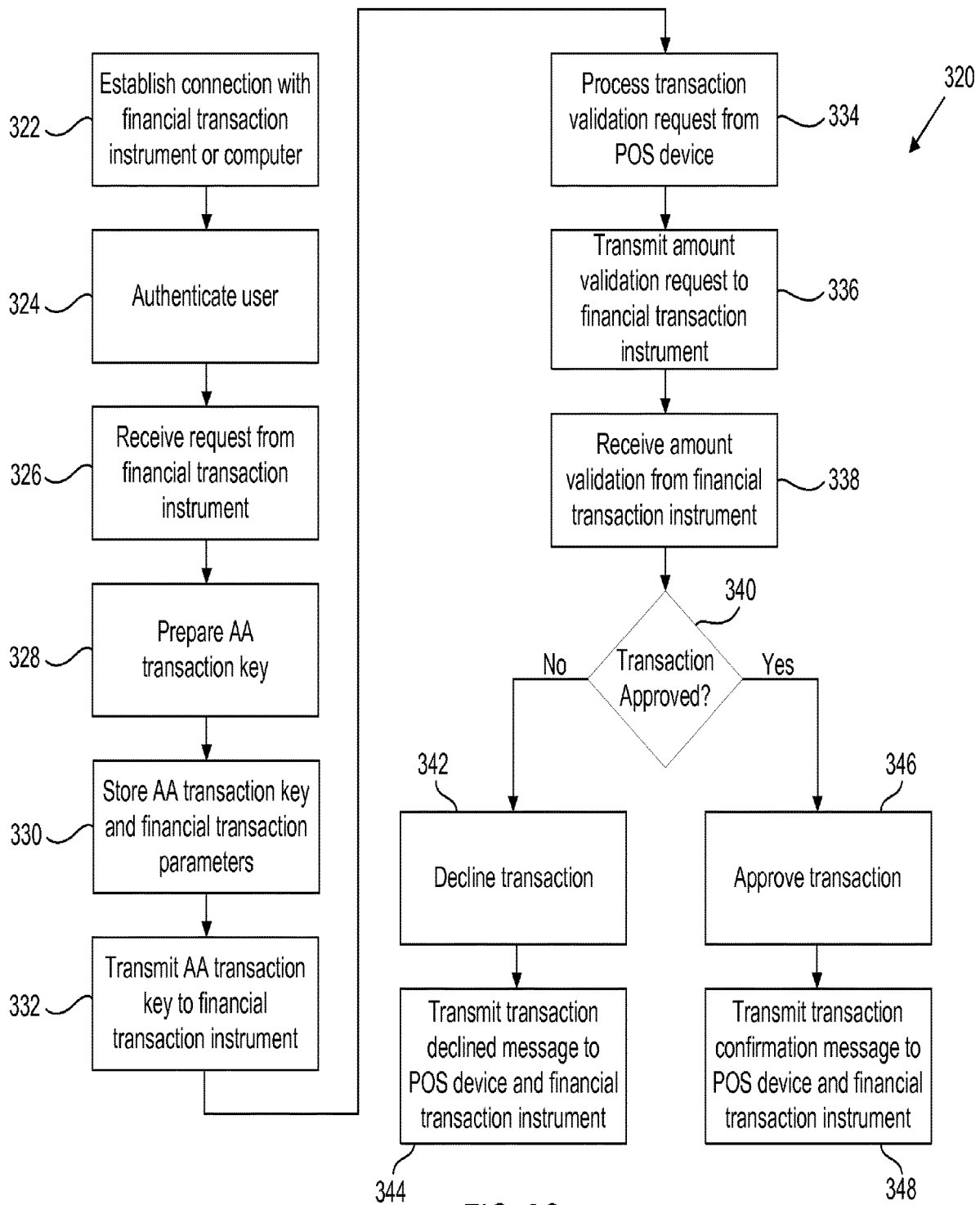
FIG. 3C is a flow chart of one example of a method performed by a financial institution during a financial transaction utilizing active authentication.

FIG. 3C illustrates a method 320 performed by a computing device 34, 36 of FI 20 during a financial transaction that utilizes active authentication. At block 322, a connection is established with a mobile financial transaction instrument 100 or computer 54. The connection with mobile financial transaction instrument 100 may be established using HTTPS or another encrypted communication link. FI 20 authenticates the user by confirming that the username or customer number and password received from mobile financial transaction instrument 100 correspond to a user account with the FI 20 at block 324.

At block 326, FI 20 receives data defining a financial transaction from mobile financial transaction instrument 100 or computer 54. The data defining the financial transaction may include, but are not limited to, a name or type of a merchant at which the financial transaction is to be performed (e.g., a clothing store, a food store, a gas station, movie theater, etc.), a location of the merchant, a period of time during which the transaction is to be executed (e.g., next thirty minutes, next three hours, next week, etc.), a transaction type (e.g., credit, debit, etc.) and a maximum authorized transaction amount, to name a few potential parameters of the financial transaction.

FI 20 generates a temporary, single-use AA transaction key at block 328. The single-use AA transaction key may be an alpha numeric string in which the first several digits may be used to identify the financial institution that generated the transaction key and the remainder of the transaction key may be a random string that does not include any personal account identification information related to the user. The AA transaction key may be generated by a random number generator that appends the random alpha numeric string to a prefix that identifies the financial institution that generates the AA transaction key. In some embodiments, the manner in which a financial institution generates an AA transaction key may differ from the manner in which other financial institutions generate the AA transactions keys. For example, some financial institutions may generate AA transaction keys that have one or more portions include data that either identifies or is based on a user's account with the institution. The one or more portions of the AA transaction key that identifies or is based on a user's account may be confidential with respect to the financial institution that generates the AA transaction, and the location of the user account information or user account-based data in the AA transaction key may vary from one financial institution to another. For example, some financial institutions may include the identification data after the prefix, some financial institutions may include the identification data at the end or in the middle of the alpha-numeric string, and some financial institutions may intersperse the identification data at certain locations throughout the alpha-numeric string.

At block 330, the financial transaction key is stored in a computer readable storage medium, such as data storage devices 26, along with the data received from mobile financial transaction instrument 100 that identify the parameters of the authorized financial transaction.

At block 332, FI 20 transmits the AA transaction key to mobile financial transaction instrument 100. FI 20 receives and processes a request to validate a financial transaction from a POS device 62 at block 334. For example, FI 20 extracts data from message and verifies the authenticity of the AA transaction key. The authentication of the AA transaction key may include searching data storage devices 26 to ensure that the AA transaction key has been generated and stored. FI 20 may also compare data in the message received from POS device 62 to data stored in data storage devices 26 that is associated with the AA transaction key and was received from mobile financial transaction instrument 100. For example, FI 20 may check to ensure that the transaction amount received from POS device 62 is less than or equal to the authorized transaction amount received from mobile financial transaction instrument block 326, may check that the POS device 62 from which the AA transaction key was received is associated with a merchant 60 that is of the type the user authorized at block 326, or may check to confirm other data received from POS device 62 is in accordance with the user-approved parameters of the financial transaction.

As described above, FI 20 may also validate the identity and existence of merchant 60 to provide enhanced security against fraud. For example, FI 20 may extract the merchant ID and the IP address from which the authorization request message was received and transmit the extracted information to the AA Registry. FI 20 receives a response from the AA Registry confirming or denying the existence or identification of the merchant 60 from which the POS device 62 is associated. If the message received from the AA Registry identifies that the information received from POS device 62 of merchant 60 does not match information on file with the AA Registry (i.e., the information is fraudulent or the merchant does not exist), then FI 20 may terminate or decline the transaction. If the message received from the AA Registry identifies that the information received from POS device 62 of merchant 60 matches information on file with the AA Registry, then FI 20 may continue authorizing the transaction.

In some embodiments in which additional security is desired, FI 20 transmits a validation request to mobile financial transaction instrument 100 that is based on the data received from POS device 62 at block 336. The validation request may include various parameters concerning the financial transaction that are to be displayed on display 106 of mobile financial transaction instrument 100 and requests the user to validate the transaction using mobile financial transaction instrument 100. At block 338, FI 20 receives a message from payment 100 that identifies if the user approved or denied the transaction.

FI 20 determines if the transaction should be approved or denied at decision block 340. The decision to approve or decline the financial transaction may be based on the single-use AA transaction key received from POS device 54, by comparing the data received from POS device 62 to the data received from mobile financial transaction instrument 100, including the single-use AA transaction key, and/or by determining if merchant 60 is fraudulent. In embodiments in which the additional security steps are implemented, FI 20 may also base the authorization decision on the user's response to the validation request received by FI 20 at block 338.

If the transaction is not approved, then FI 20 declines the transaction at block 342 and transmits a transaction declined message to POS device 62 and/or to mobile financial transaction instrument 100 at block 344. As will be understood by those skilled in the art, the transaction may be declined if the amount of the transaction exceeds the pre-approved transaction amount, if the single-use transaction key either does not exist or has expired, the user declines the transaction when prompted on the mobile financial transaction instrument 100, or for other reasons such as FI 20 determining that merchant 60 is fraudulent or does not exist.

If the transaction is approved, then FI 20 approves the transaction at block 346 and transmits a transaction approved message to POS device 62 and/or to mobile financial transaction instrument 100 at block 348. FI 20 may approve the transaction based on the single-use transaction key, if the parameters of the transaction received from POS device 62 sufficiently match the pre-defined financial transaction parameters entered by the user, and/or if the response to the transaction authorization message received from mobile financial transaction instrument 100 identifies the transaction as being approved.

Figure 3D:
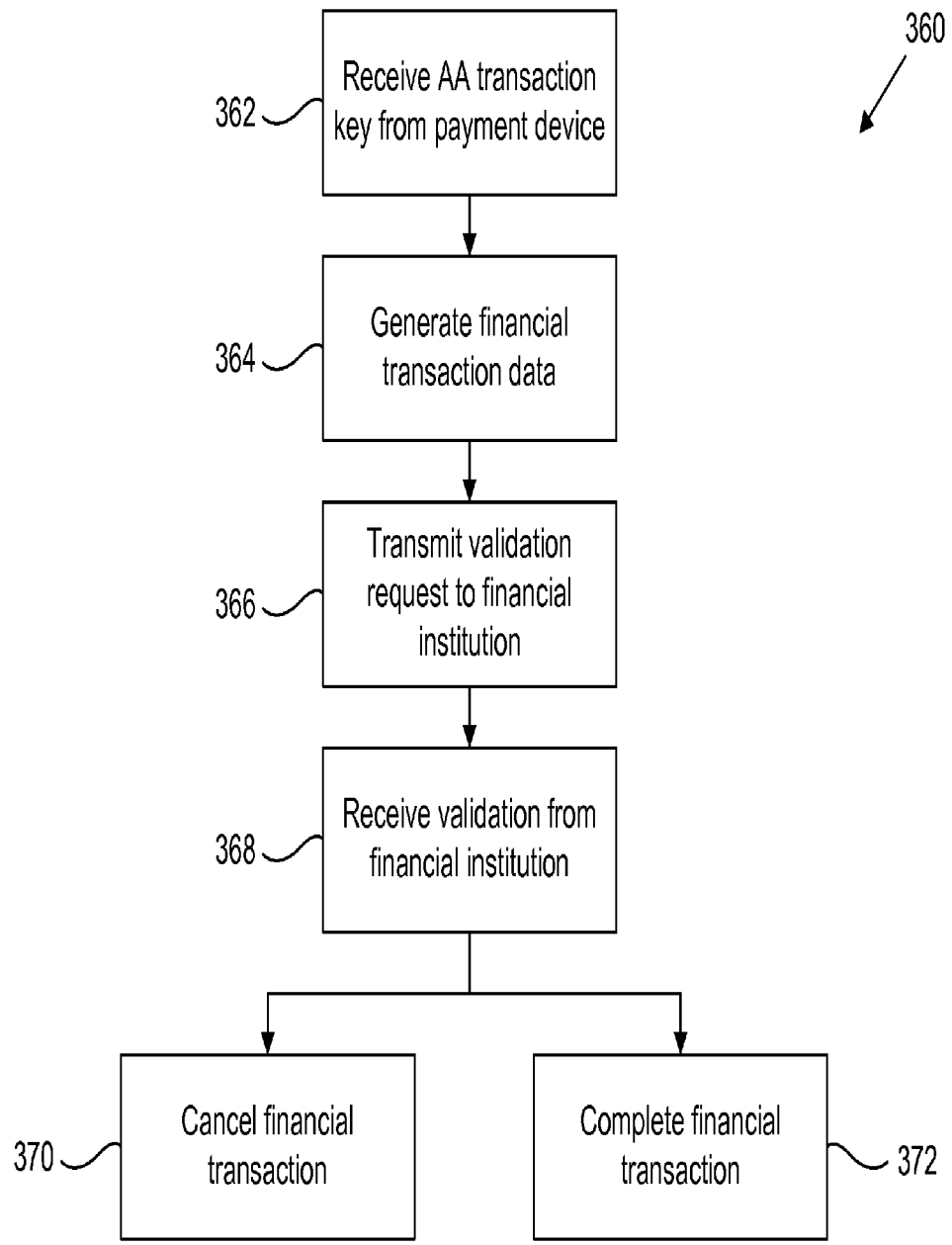
FIG. 3D is a flow chart of one example of a method performed by a point-of-sale device of a merchant during a financial transaction utilizing active authentication.

FIG. 3D illustrates a method 360 performed by POS device 62 during a financial transaction that utilizes active authentication. Method 360 begins with POS device 62 receiving a single-use transaction key from mobile financial transaction instrument 100. The transaction key may be received from mobile financial transaction instrument 100 using NFC, Bluetooth, or another wireless transmission protocol. At block 364, POS device 62 generates data for the financial transaction for transmission to FI 20. Examples of the financial transaction data may include, but are not limited to, a merchant ID, the total amount of the transaction, a location of the merchant, to list a few possibilities.

POS device 62 transmits a message to FI 20 at block 366 requesting approval of the financial transaction. The message transmitted from POS device 62 may include the transaction key received from mobile financial transaction instrument 100 and financial transaction data generated by POS device 62. The message transmitted from POS device 62 to FI 20 may be transmitted over a closed network connection.

In some embodiments, POS device 62 may obtain the IP address or other contact information for FI 20 by contacting the AA Registry. For example, P0 device 62 may strip off the first several characters of the AA transaction key received from mobile financial transaction instrument 100 and send these characters to the AA Registry. POS device 62 may receive the IP address or other contact information for routing the AA transaction key to FI 20 from the AA Registry. In some embodiments, POS device 62 retrieves the IP address of the financial institution from a local non-transient computer readable storage medium in which the financial institution contact information is associated with the identifiers of the financial institution that are included in the AA transaction key.

At block 368, POS device 62 receives a message from FI 20 identifying if the financial transaction has been approved or declined. The message may be received from financial transaction over the same closed network connection over which POS device 62 transmitted the authorization request. If the message received from FI 20 identifies that the transaction has been declined, then POS device 20 cancels the financial transaction at block 370. Canceling the financial transaction may include displaying a message on a display that the transaction has been declined and/or transmitting a message to mobile financial transaction instrument 100 that causes a message to be displayed on display 106 that the transaction has been declined. If the message received from FI 20 identifies that the transaction has been approved, then the financial transaction completed at block 372. Completing the financial transaction may include displaying a message on a display of POS device 62 that the transaction has been approved and/or transmitting a message to mobile financial transaction instrument 100 that causes a message to be displayed on display 106 that the transaction has been approved.

Figure 4A:
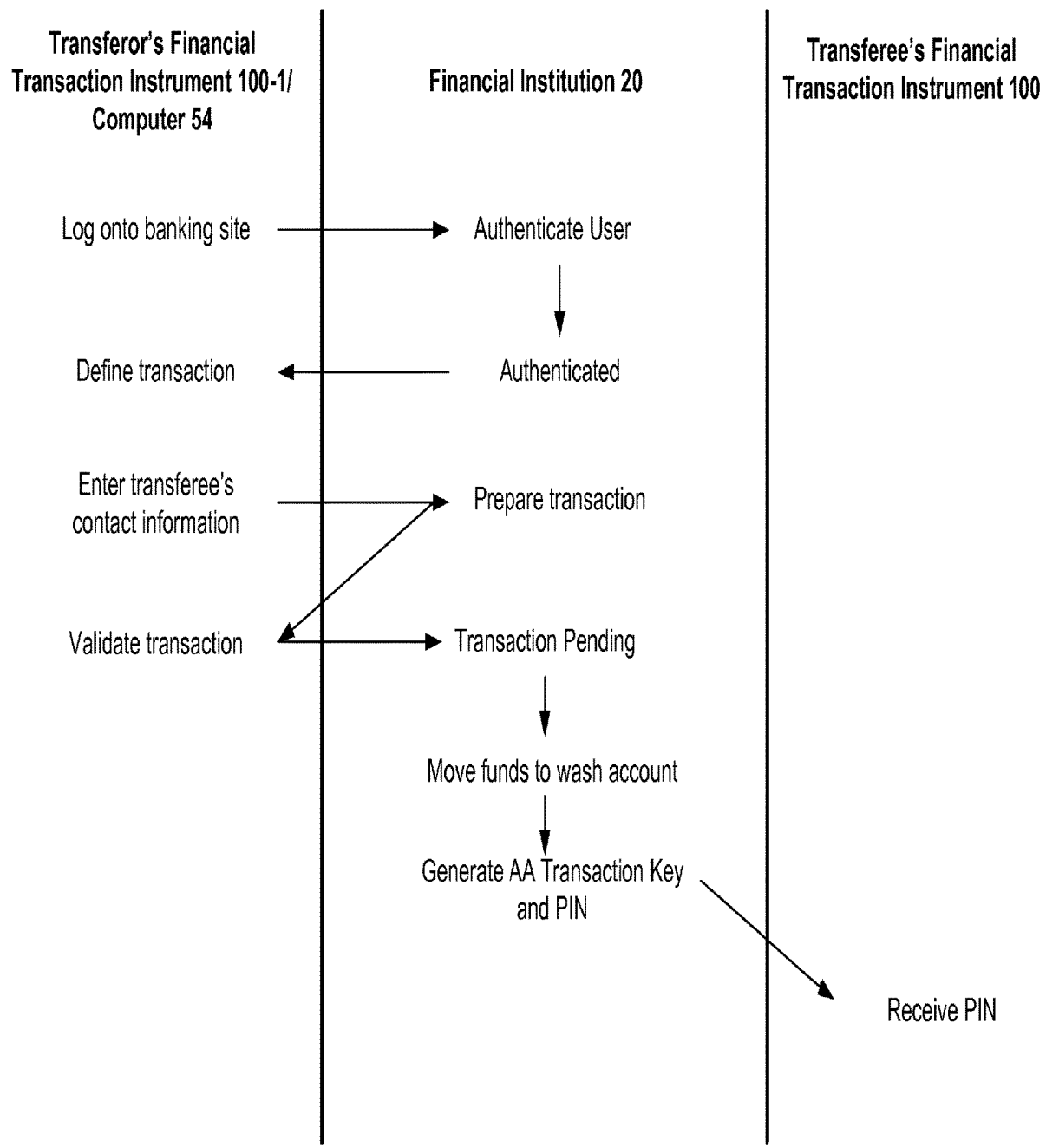
FIGS. 4A and 4B illustrate are flow charts of one example of a method of wiring funds to a third party using active authentication.
Figure 4B:
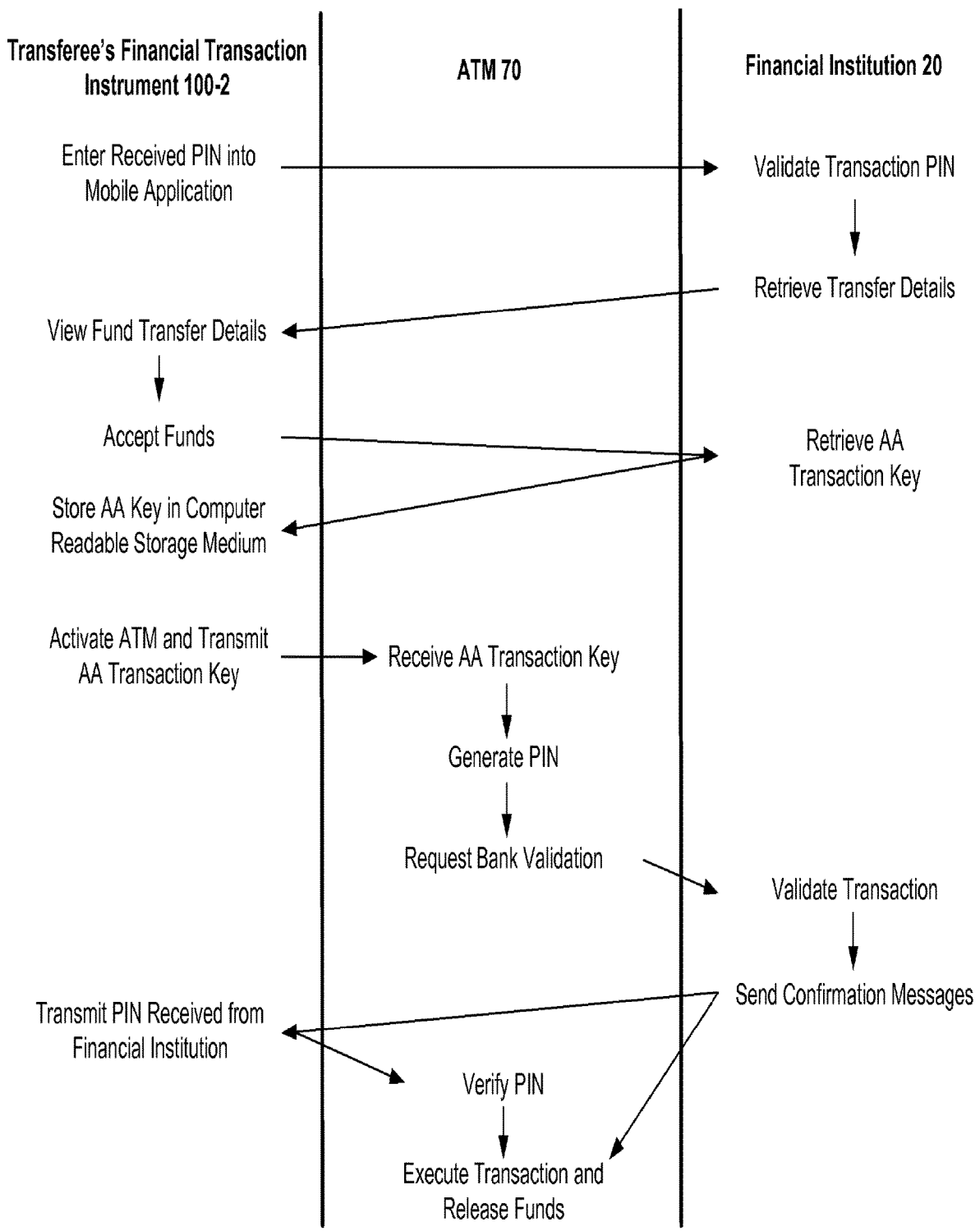

Other financial transactions that may be performed using AA transaction keys include transferring funds to a third party. FIGS. 4A and 4B illustrate the transmission of data between a transferor (person transferring funds), a financial institution, a transferee (person receiving funds), and an ATM. As shown in FIG. 4A, a fund transfer transaction begins with the transferor logging into a website of FI 20. The transferor may log onto the website using a computer 54 or by using a mobile application or web browser installed on a mobile financial transaction instrument 100.

Mobile financial transaction instrument 100 or computer 54 establishes a connection with server 36 on which the F1's website resides using HTTPS or other encrypted communication protocol, and the financial institution's website may authenticate the user based on data received from mobile financial transaction instrument 100 or computers 34, 54. Such data may include a customer number or user name and password that the user inputs into a GUI 28 displayed on display 106 using an input device 128 as will be understood by those skilled in the art.

Once the customer number or user name and password are authenticated by FI 20, a message is transmitted via HTTPS or other encryption communication protocol to mobile financial transaction instrument 100 or computer 54. The message may be displayed in a GUI 28 that is displayed on display 106 of mobile financial transaction instrument 100 or computer 54 that provides a user with one or more editable fields or input buttons. For example, the GUI displayed to the user may enable the user to identify various parameters concerning an upcoming fund transfer transaction. Examples of such data that a user may enter may include, but not be limited to, the amount of the fund transfer, an account from which the funds are to be transferred, a phone number or other unique identifier (e.g., an international mobile subscriber identity ("MR"), an electronic serial number ("ESN"), or a media access control ("MAC") address) of the mobile financial transaction instrument of the transferee, and a time period during which the fund transfer may be performed, to name a few possible data entries.

FI 20 may generate a GUI that displays the parameters of the fund transfer transaction and requests the transferor to confirm the transaction. Upon receiving a confirmation of the transaction, which may be received by FI 20 in response to the transferor using an input device 128 of mobile financial transaction instrument 100 or computer 54, FI 20 prepares a unique AA transaction key and a PIN for the wiring transaction. The AA transaction key may be an alpha numeric string in which the first several digits may be used to identify the financial institution that generated the AA transaction key and the remainder of the AA transaction key may be a random string that does not include any personal account or otherwise static identification information related to the user. In some embodiments, the AA transaction key is generated by a random number generator that appends the random alpha numeric string to a prefix that identifies the financial institution that generates the AA transaction key. As described above, the manner in which a financial institution generates an AA transaction key may differ from the manner in which other financial institutions generate the AA transactions keys. For example, some financial institutions may generate AA transaction keys that have one or more portions include data that either identifies or is based on a user's account with the institution.

A copy of the unique AA transaction key and PIN may be locally or remotely stored by FI 20 in a data storage unit 26 for later use as described below. Additionally, FI 20 may transfer funds from the transferor's bank account to a wash or other holding account and transmit the PIN to mobile financial transaction instrument 100 of the transferee. The PIN may be transmitted to the transferee's mobile financial transaction instrument 100 via short message service ("SMS"), email, voice mail, or via any other messaging manner as will be understood by one skilled in the art.

Turning now to FIG. 4B, the transferee logs onto a website of FI 20 using the transferee's mobile financial transaction instrument 100. In some embodiments, transferee downloads and installs a mobile application onto the transferee's mobile financial transaction instrument 100. The transferee does not need to have an account or be otherwise associated with FI 20. The mobile application establishes a connection with server 36 of FI 20 using HTTPS or other encrypted communication protocol. The transferee may enter the PIN into GUI 30 displayed on display 106 of the transferee's mobile financial transaction instrument 100.

FI 20 validates the PIN received from mobile financial transaction instrument 100 and retrieves the parameters of the wiring transaction from data storage device 26. The details of the wiring transaction may be presented to the transferee on a GUI 30 displayed on display 106 of mobile financial transaction instrument 100. The transferee may accept the funds by using input device 128 to indicate his/her acceptance of the fund transfer on GUI 30.

FI 20 retrieves the single-use AA transaction key from data storage devices 26 in response to the transferee's input accepting the fund transfer. The AA transaction key is transmitted from FI 20 to the mobile financial transaction instrument 100 of the transferee. The AA transaction key is stored in a computer readable storage medium, such as main memory 108 and/or secondary memory 110, on mobile financial transaction instrument 100.

At some time after the fund transfer has been setup, the transferee approaches an ATM 70 that is equipped with a wireless transmission module for transferring and receiving data from mobile financial transaction instrument 100. Such wireless transmission modules include, but are not limited to, modules that enable ATM 70 to transmit and receive data via NFC, Bluetooth, or through other wireless communication protocols. The transferee initiates a withdrawal of funds from ATM 70 by placing mobile financial transaction instrument 100 near ATM 70 such that the AA transaction key is transmitted to ATM 70.

ATM 70 generates a second PIN in response to receiving the AA transaction key from mobile financial transaction instrument 100. The PIN and AA transaction key are transmitted from ATM 70 to FI 20 in a request to authorize the disbursement of funds. ATM 70 may query the AA Registry using the first several characters of the AA transaction key to acquire the contact information for FI 20, or ATM 70 may be able to determine the contact information for FI 20 based on a locally stored database in which the first several characters of the AA transaction key are associated with the contact information for the financial institution.

FI 20 determines if the funds should be disbursed by ATM 70 based on the AA transaction key embedded within the authorization request message received from ATM 70, which may be received through a closed network connection. If the transaction key is validated, FI 20 transmits a message authorizing the disbursement of funds to ATM 70 via the closed network connection and transmits the second PIN to the mobile financial transaction instrument 100 of the transferee.

The second PIN may be received at mobile financial transaction instrument 100 and be automatically transferred to ATM 70 via a wireless communication channel. In some embodiments, the second PIN may be received at mobile financial transaction instrument 100, which notifies the transferee in response. Such notification may include flashing an LED of mobile financial transaction instrument 100, displaying a message on display 106, and/or causing mobile financial transaction instrument 100 to vibrate or emit a noise, to list a few potential notification possibilities. The transferee may input the second PIN directly into ATM 70 using an input device of ATM 70.

ATM 70 receives the second PIN from mobile financial transaction instrument 100 and verifies that the PIN matches the PIN that was transmitted to FI 20. If ATM 70 confirms that the PIN received from mobile financial transaction instrument 100 matches the PIN transmitted to FI 20, then ATM 70 releases the funds to transferee.

Figure 4C:
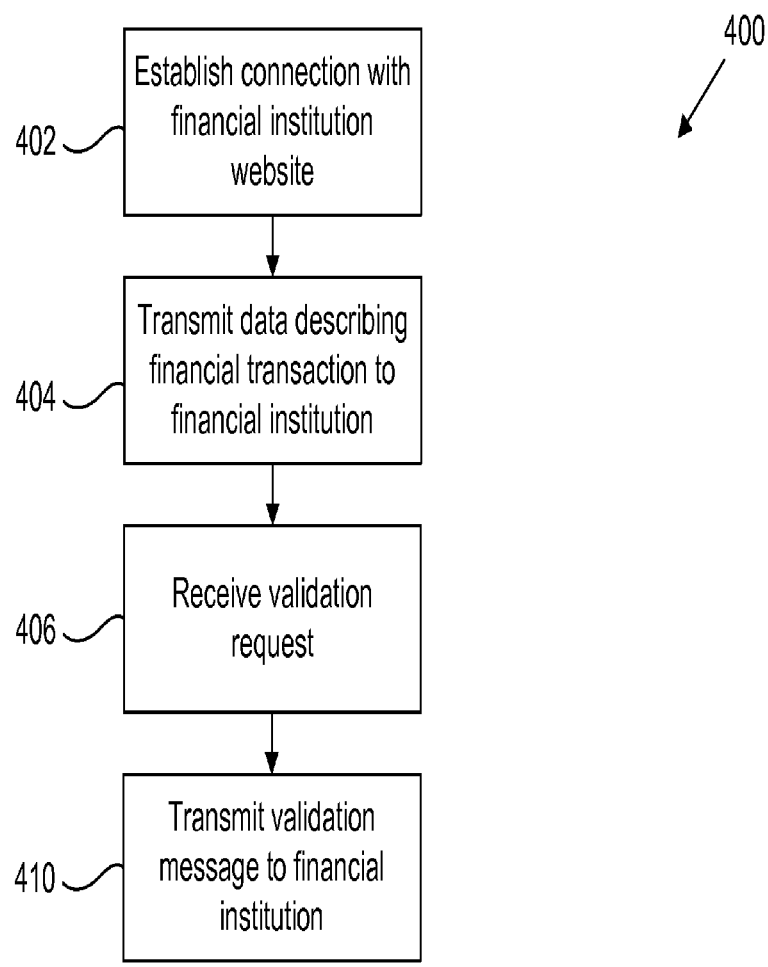
FIG. 4C is a flow chart of one example of the functions performed by a computer or mobile financial transaction instrument used by a transferor during a fund transfer method in accordance with FIGS. 4A and 4B.

FIG. 4C is illustrates one example of a method 400 that may be performed by a mobile financial transaction instrument 100 or computer 54 accessed by a transferor during a fund transfer transaction such as the one illustrated in FIGS. 4A and 4B. At block 402, mobile financial transaction instrument 100 or computer 54 establishes a connection with a website provided by FI 20. As described above, the connection may be established between computer 54 or mobile financial transaction instrument 100 and server 36 using HTTPS or other encrypted communication link. The transferor may access a customer portal 28 of FI 20 where the transferor inputs a username or customer ID along with a password. The access to the website may be provided through a browser on computer 54 or mobile financial transaction instrument 100 or through a mobile application that is downloaded and installed on mobile financial transaction instrument 100.

The transferor may enter parameters of the fund transfer into GUI 28 of the website provided by FI 20, which are transferred to FI 20 at block 404. Examples of the parameters include, but are not limited to, the amount of funds to be transferred, the account from which the funds are to be sourced, and a period of time during which the funds transfer is to be performed, to list only a few possible parameters. The transferor may also provide a phone number or other identification number of the transferee's mobile financial transaction instrument 100 at block 404. In some embodiments, an email address of the transferee in addition to, or instead of, the phone number of the transferee's mobile financial transaction instrument 100 may be provided.

In some embodiments, financial transaction device 100 or computer 54 may receive a request from FI 20 requesting the transferee to confirm and authorize the fund transfer at block 406 For example, computer 54 or mobile financial transaction instrument 100 may display a message or GUI 28 on display 106 requesting the transferor to use input device 128 to confirm and authorize the transaction. Transferor may use input device 128 to confirm and authorize the transaction in response to the prompt displayed on display 106, which is then transferred from computer 54 or mobile financial transaction instrument 100 to FI 20 at block 408.

Figure 4D:
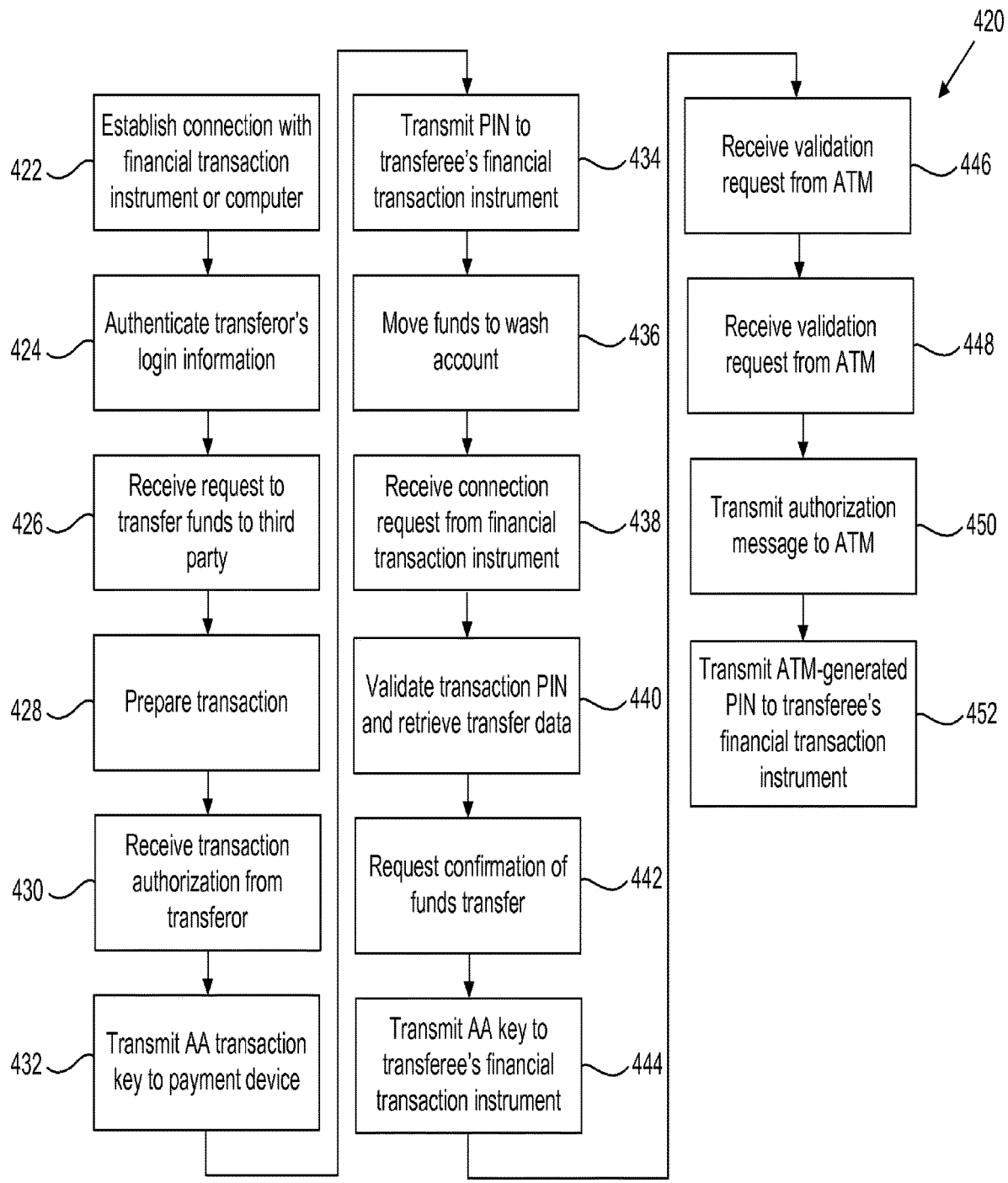
FIG. 4D is a flow chart of one example of the functions performed by a financial institution in accordance with the fund transfer method illustrated in FIGS. 4A and 4B.

FIG. 4D illustrates a method 420 performed by FI 20 during a funds transfer transaction such as the funds transfer transaction illustrated in FIGS. 4A and 4B. As shown in FIG. 4D, FI 20 establishes a connection with mobile financial transaction instrument 100 or computer 54 at block 422. The connection may be established between FI 20 and computer 54 or mobile financial transaction instrument 100 using HTTPS or other encrypted communication link. At block 424, FI 20 authenticates the credentials of the transferor received from computer 54 or mobile financial transaction instrument 100. Authenticating the transferor's login information may include comparing the username or customer ID and password to a database stored in data storage devices 26 that includes each of a plurality of customer usernames or identification numbers associated with a password.

FI 20 receives a request for transferring funds to a third party at block 426. The request may include various parameters defining the transaction such as, for example, the amount of funds to be transferred, the account from which the funds are to be withdrawn, and an amount of time during which the funds may be transferred. FI 20 may also receive a phone number or other identification number, such as a MAC address, IMSI or ESN, of the transferee's mobile financial transaction instrument 100 at block 404. In some embodiments, FI 20 may receive an email address of the transferee in addition to, or instead of, the phone number of the transferee's mobile financial transaction instrument 100.

At block 428, FI 20 prepares the funds transaction. For example, FI 20 may check to ensure that the amount of funds to be transferred is less than the total amount of funds available for withdrawal in the account identified by transferor, store the parameters of the transaction in a computer readable storage medium, and cause a transaction confirmation GUI to be displayed to transferor. FI 20 receives an authorization for the transaction from computer 54 or mobile financial transaction instrument 100 being used by transferor at block 430.

At block 432, FI 20 generates a one-time AA transaction key and a PIN, which are stored in one or more data storage device 26. The AA transaction key can be a random alpha numeric string that is appended to a prefix that identifies the financial institution that generated the transaction key. As will be understood by one skilled in the art, the random portion of the AA transaction key may be generated by a random number generator. Advantageously, the AA transaction key does not include static user account information that may be stolen by a third party and used to gain access to the user's funds.

In some embodiments described above, some financial institutions may generate AA transaction keys that have one or more portions include data that either identifies or is based on a user's account with the institution. The one or more portions of the AA transaction key that identifies or is based on a user's account may be confidential with respect to the financial institution that generates the AA transaction, and the location of the user account information or user account-based data in the AA transaction key may vary from one financial institution to another. For example, some financial institutions may include the identification data after the prefix, some financial institutions may include the identification data at the end or in the middle of the alpha-numeric string, and some financial institutions may intersperse the identification data at certain locations throughout the alpha-numeric string.

FI 20 transmits the PIN to transferee's mobile financial transaction instrument 100 at block 434. In some embodiments, the PIN is transmitted to via SMS messaging, although one skilled in the art will understand that the PIN may be transmitted via email, telephonically, or via any other messaging manner. At block 436, FI 20 transfers the funds that are to be transferred to a third party from the transferor's account to a wash account or other temporary holding account for later disbursement.

A connection is established with the transferee's mobile financial transaction instrument 100-1 at block 438. The connection may be established using HTTPS or another encrypted communication protocol through which the transferee gains access to a GUI 30 provided by FI 20. At block 440, FI 20 validates the PIN received from mobile financial transaction instrument 100 of the transferee and uses the PIN to retrieve data for the fund transfer transaction from one or more of the data storage device 26. GUI 30 provided by FI 20 requests transferee to confirm the funds transfer at block 442. If transferee accepts the funds, then at block 444 FI 20 transfers the at least partially random AA transaction key to mobile financial transaction instrument 100 of the transferee.

At block 446, FI 20 receives an authorization request from ATM 70. The authorization request may be received at FI 20 from ATM 70 via a closed network connection and includes the AA transaction key and a second PIN generated by ATM 70. FI 20 confirms that the AA transaction key matches a copy of the AA transaction key stored in data storage device 26 and checks to ensure that the authorized time for the funds transfer as identified by the transferor has not lapsed.

FI 20 transmits an authorization message to ATM 70 via the closed connection at block 450 and transmits the second PIN received from ATM 70 to the mobile financial transaction instrument 100 of the transferee at block 452.

Figure 4E:
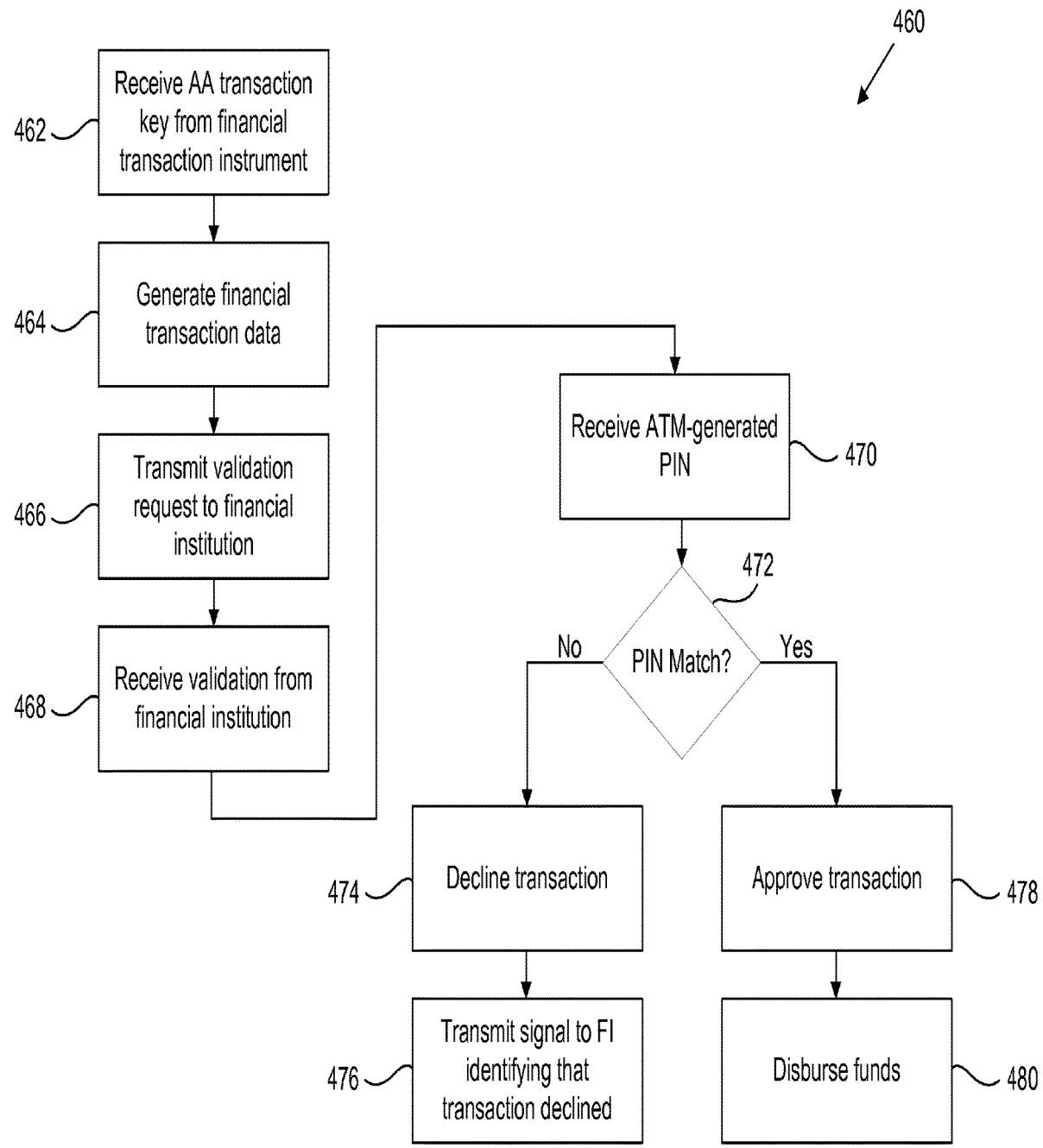
FIG. 4E is a flow chart of one example of the functions performed by an ATM in accordance with the fund transfer method illustrated in FIGS. 4A and 4B.

FIG. 4E illustrates a method 460 performed by an ATM 70 during a funds transfer transaction such as the funds transfer transaction illustrated in FIGS. 4A and 4B. ATM 70 receives an AA transaction key from the mobile financial transaction instrument 100 of transferee at block 462. The AA transaction key is received from the transferee's mobile financial transaction instrument 100 via a wireless transmission protocol such as NFC, Bluetooth, or the like.

At block 464, ATM 70 generates a PIN in response to receiving the transaction key from mobile financial transaction instrument 100. The PIN may be a multi-digit number generated by a random number generator as will be understood by one skilled in the art. If the PIN is to be keyed into the ATM 70, then the PIN is numeric such that it may be used with conventional ATMs. However, if ATMs are capable of receiving alpha numeric codes via keypads or if the PIN is to be entered on the mobile financial transaction instrument 100 and then transferred to the ATM, then the PIN may be alpha numeric. ATM 70 transmits a validation request to financial institution 20 at block 466. The validation request message is transmitted via a closed network connection and includes the ATM-generated PIN. The validation request message may also include a copy of the AA transaction key received from mobile financial transaction instrument 100.

ATM 70 may query the AA Registry for the contact information of FI 20 based on the AA transaction key. For example, ATM 70 may forward the first several characters of the AA transaction key to the AA Registry, which then uses the received characters to identify the financial institution that generated the AA transaction key and the contact information (e.g., IP address) for the financial institution. In some embodiments, ATM 70 may have the appropriate contact information for the financial transaction locally stored in a non-volatile computer readable storage medium.

ATM 70 receives a message from FI 20 authorizing the disbursement of funds at block 468. The message received from FI 20 authorizing the disbursement may be received over the same closed network connection between ATM 70 and FI 20 that was used to transmit the authorization request from ATM 70 to FI 20. At block 470, ATM 70 receives the ATM-generated PIN. In some embodiments, the ATM-generated PIN is received from mobile financial transaction instrument 100 via NFC, Bluetooth, or in accordance with another wireless connection protocol. In some embodiments, ATM 70 receives the ATM-generated PIN by the transferee entering the PIN using an input device 128 of the ATM in response to being prompted by ATM 70. For example, ATM 70 may display a message on display 106 of ATM 70 requesting the transferee to enter the ATM-generated PIN using input device 128 of ATM 70.

At decision block 472, ATM 70 determines if the PIN received from transferee matches the ATM-generated PIN that ATM 70 transmitted to FI 20. If the received PIN does not match the ATM generated PIN, which may be stored in a computer readable storage medium, such as main memory 108 and/or secondary memory 110, then ATM 70 declines the transaction at block 474. ATM 70 may display a message on display 106 that the transaction has been declined when declining the transaction. At block 476, ATM 70 transmits a message to FI 20 identifying that the transaction was declined and the funds were not disbursed due to the PIN received by ATM 70 not matching the stored ATM-generated PIN.

If ATM 70 determines that the received PIN matches the stored version of the ATM-generated PIN at decision block 472, then ATM 70 approves the transaction at block 478. At block 480, ATM 70 disburses the funds to the transferee to complete the fund transfer.

Figure 5A:
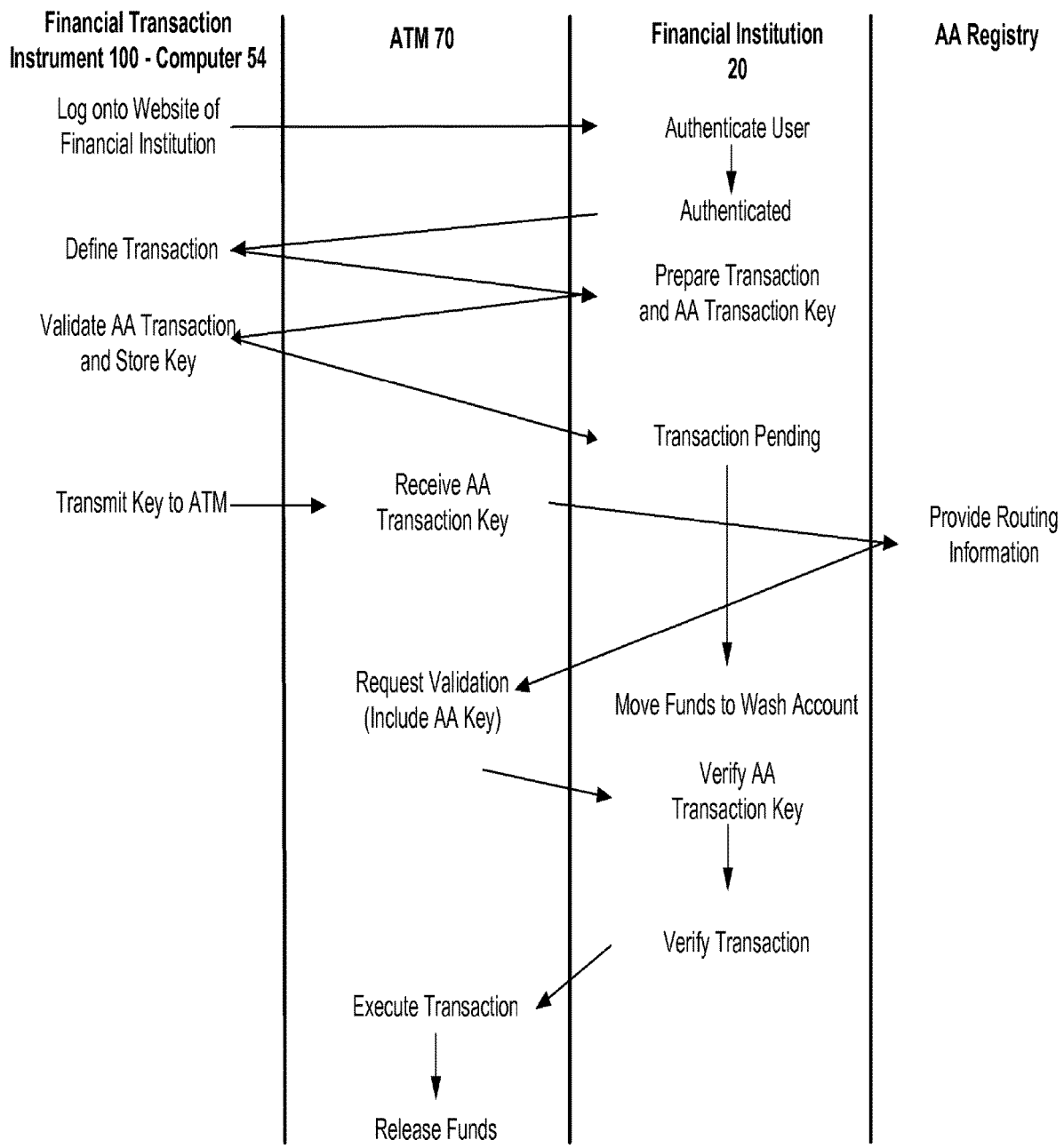
FIG. 5A illustrates the flow of data in one example of an improved ATM transaction.

In addition to the financial transaction described above, mobile financial transaction instrument 100 may also be used to perform near-instant transactions at an ATM. As shown in FIG. 5A, a user logs into a website of FI 20 using a computer 34, 54, a mobile financial transaction instrument 100, or any other device programmed with a Web browser or other software to locate and select (such as by clicking with a mouse) a particular webpage. In some embodiments, the user may access a website of the FI 20 via a mobile application that has been downloaded and installed on mobile financial transaction instrument 100. Mobile financial transaction instrument 100 or computer 54 establishes a connection with server 36 on which the F1's website resides using HTTPS or other encrypted communication protocol.

The F1's website authenticates the user based on data received from mobile financial transaction instrument 100 or computers 34, 54. Such data may include a customer number or user name and password that the user inputs into a GUI 28 displayed on display 106 using an input device 128 as will be understood by those skilled in the art.

Once the customer number or user name and password are authenticated by FI 20, a message is transmitted via HTTPS or other encryption communication protocol to mobile financial transaction instrument 100 or computer 34, 54. The message may be displayed in a GUI 28 that on display 106 of input device 128 or computer 54 that provides a user with one or more editable fields or input buttons. For example, the GUI displayed to the user may enable the user to identify various parameters concerning an upcoming financial transaction that is to take place at an ATM 70. Examples of such data that a user may enter may include, but not be limited to, the type of transaction (e.g., a withdrawal, a deposit, and! or a fund transfer), a location of the ATM, a period of time during which the ATM transaction is to be executed (e.g., next twenty minutes, next four hours, the next day, etc.), an account of the user from which funds are to be withdrawn or into which they are to be deposited, and an amount of the transaction, to name a few potential parameters.

Once the user has entered the parameters for the ATM transaction, the data entered by the user is transmitted to FI 20. FI 20 receives the parameters of the ATM transaction from the mobile financial transaction instrument 100 or computer 34, 54 and prepares a unique AA transaction key for the transaction. As described above, the single-use AA transaction key may be an alpha numeric string in which the first several digits may be used to identify the financial institution that generated the transaction key and the remainder of the transaction key may be a random string that does not include any personal account identification information. In some embodiments, some financial institutions may generate AA transaction keys that have one or more portions include data that either identifies or is based on a user's account with the institution. As described above, some financial institutions may include the identification data after the prefix, some financial institutions may include the identification data at the end or in the middle of the alpha-numeric string, and some financial institutions may intersperse the identification data at certain locations throughout the alpha-numeric string. A copy of the unique transaction key may be locally or remotely stored by FI 20 in a data storage unit 26 for later use as described below.

FI 20 forwards a copy of the AA transaction key to mobile financial transaction instrument 100 where it is stored in a computer readable storage medium, such as main memory 108 and/or secondary memory 110. The unique AA transaction key is transmitted to mobile financial transaction instrument 100 associated with the user's account at the FI 20 even if the user sets up the financial transaction from computer 34, 54. Mobile financial transaction instrument 100 transmits a message to FI 20 once the unique AA transaction key for the ATM transaction has been stored by mobile financial transaction instrument 100 at which point the ATM transaction is pending. Depending on the type of ATM transaction, FI 20 may move funds the user has identified for withdrawal or transfer from the account identified by the user to a holding account where the funds remain until the transaction is completed.

At some time after the ATM transaction has been setup, a user approaches an ATM 70 that is configured to perform contactless transactions by sending and receiving data using NFC, Bluetooth, or through other wireless communication protocols. The user places mobile financial transaction instrument 100 near ATM 70, which transfers the stored single-use AA transaction key from mobile financial transaction instrument 100 to ATM 70.

ATM 70 receives the AA transaction key from mobile financial transaction instrument 100 and extracts the first several characters of the AA transaction key that are used to identify the financial institution that generated the AA transaction key. The characters extracted from the AA transaction key are sent to the AA Registry to identify the financial institution to which the AA transaction key is to be routed. The AA Registry uses the received characters to identify the financial institution that generated the AA transaction key and the contact information (e.g., IP address) for the financial institution. In some embodiments, ATM 70 may have the appropriate contact information for the financial transaction locally stored in a non-volatile computer readable storage medium and thus do not transfer and receive data with the AA Registry.

ATM 70 transmits a message including the AA transaction key received from mobile financial transaction instrument 100 to FI 20 via a closed network connection. FI 20 receives the message from ATM 70 and validates the AA transaction key and the transaction. Validation of the AA transaction key may include extracting the AA transaction key from the message received from ATM 70 and comparing the received AA transaction key to the copy of the AA transaction key stored in data storage device 26. FI 20 may validate the transaction by checking to ensure that the ATM transaction is in accordance with the parameters defined by the user. For example, FI 20 may confirm that the transaction is being performed within the time frame authorized by the user and at a location that was authorized by the user, which may be determined by comparing data included in the message received from ATM 70 that was added by ATM 70 (e.g., an ATM identification number, time stamp, etc.).

FI 20 transmits an authorization message to ATM 70 via the closed network connection through which FI 20 received the authorization request from ATM 70. Upon receiving the authorization message from FI 20, ATM 70 executes the transaction for the user. For example, if the transaction is a withdrawal, then ATM 70 disburses the money to the user as will be understood by those skilled in the art. The near-instant ATM transaction advantageously reduces the amount of time that a person needs to remain in front of an ATM thereby increasing the security and safety of performing ATM transactions.

Figure 5B:
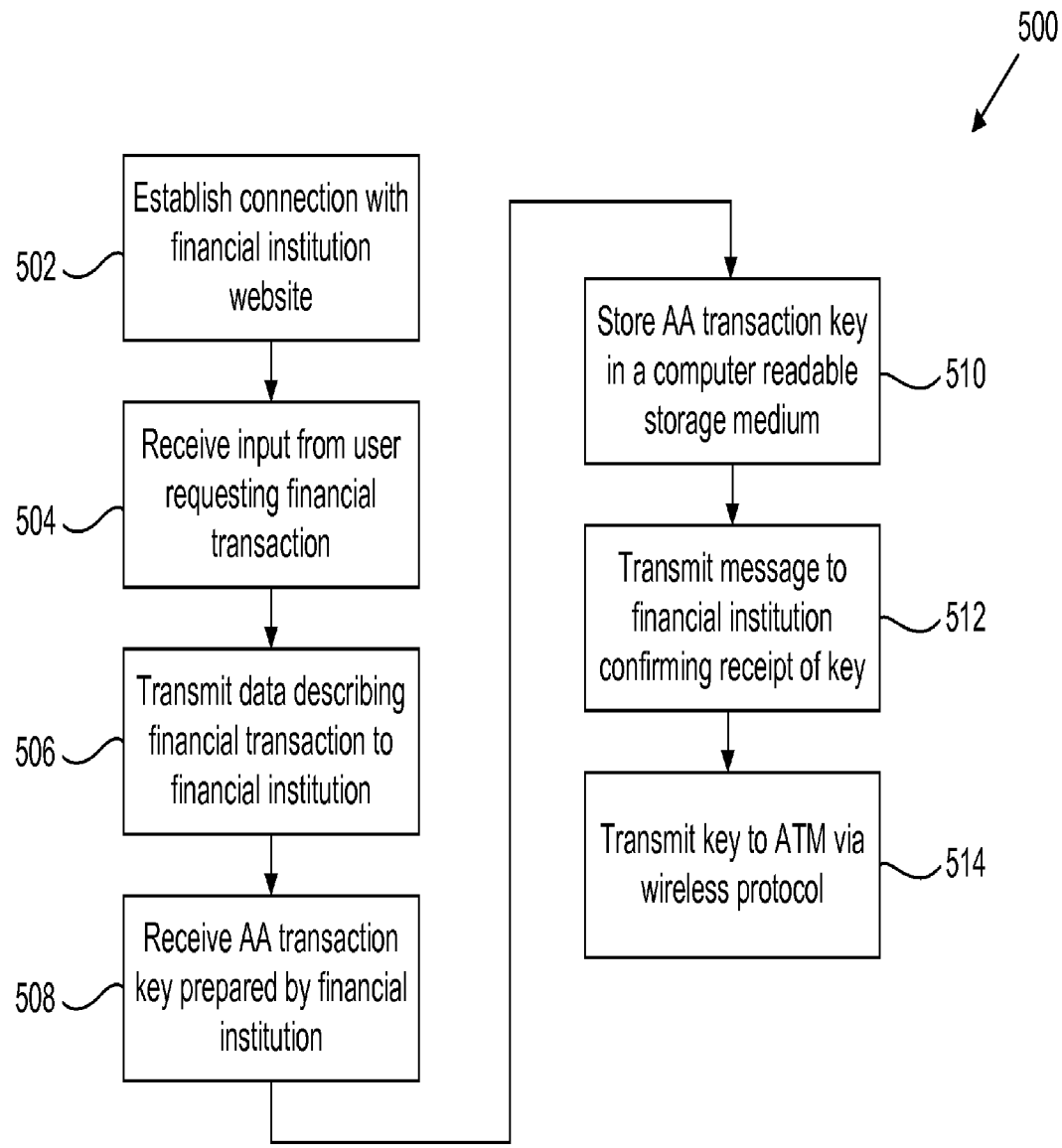
FIG. 5B is a flow chart of one example of the functions performed by a mobile financial transaction instrument in accordance with the ATM transaction illustrated in FIG. 5A.

FIG. 5B is a flow chart of the functions performed by mobile financial transaction instrument 100 during the improved ATM transaction illustrated in FIG. 5A. At block 502, mobile financial transaction instrument 100 establishes a connection with a website provided by FI 20. The connection may be established between mobile financial transaction instrument 100 and server 36 of FI 20 using HTTPS or another encrypted communication link. A user may access a customer portal 28 of FI 20 where the user inputs a username or customer ID along with a password. The access to the website may be provided through a browser on mobile financial transaction instrument 100 or through a mobile application that is downloaded and installed on mobile financial transaction instrument 100.

The user may use input device 128 to gain access to the appropriate GUI provided by the FI 20 for setting up a financial transaction. Mobile financial transaction instrument 100 receives the parameters of the ATM transaction input by user using input device 128 at block, which are forwarded from mobile financial transaction instrument 100 to FI 20 at block 506.

At block 508, mobile financial transaction instrument 100 receives an AA unique transaction key for the ATM transaction. Mobile financial transaction instrument 100 stores the unique AA transaction key in a computer readable storage medium at block 510. For example, mobile financial transaction instrument 100 may store the transaction key in main memory 108 and/or in secondary memory 110. Mobile financial transaction instrument 100 transmits a message to FI 20 confirming receipt of the transaction key at 512.

At block 514, mobile financial transaction instrument 100 transmits the stored AA transaction key to ATM 70. The transaction key may be wirelessly transmitted using NFC or other wireless communication method. Once the transaction is approved between ATM 70 and FI 20, the ATM 70 executes the transaction without further input from mobile financial transaction instrument 100.

Figure 5C:
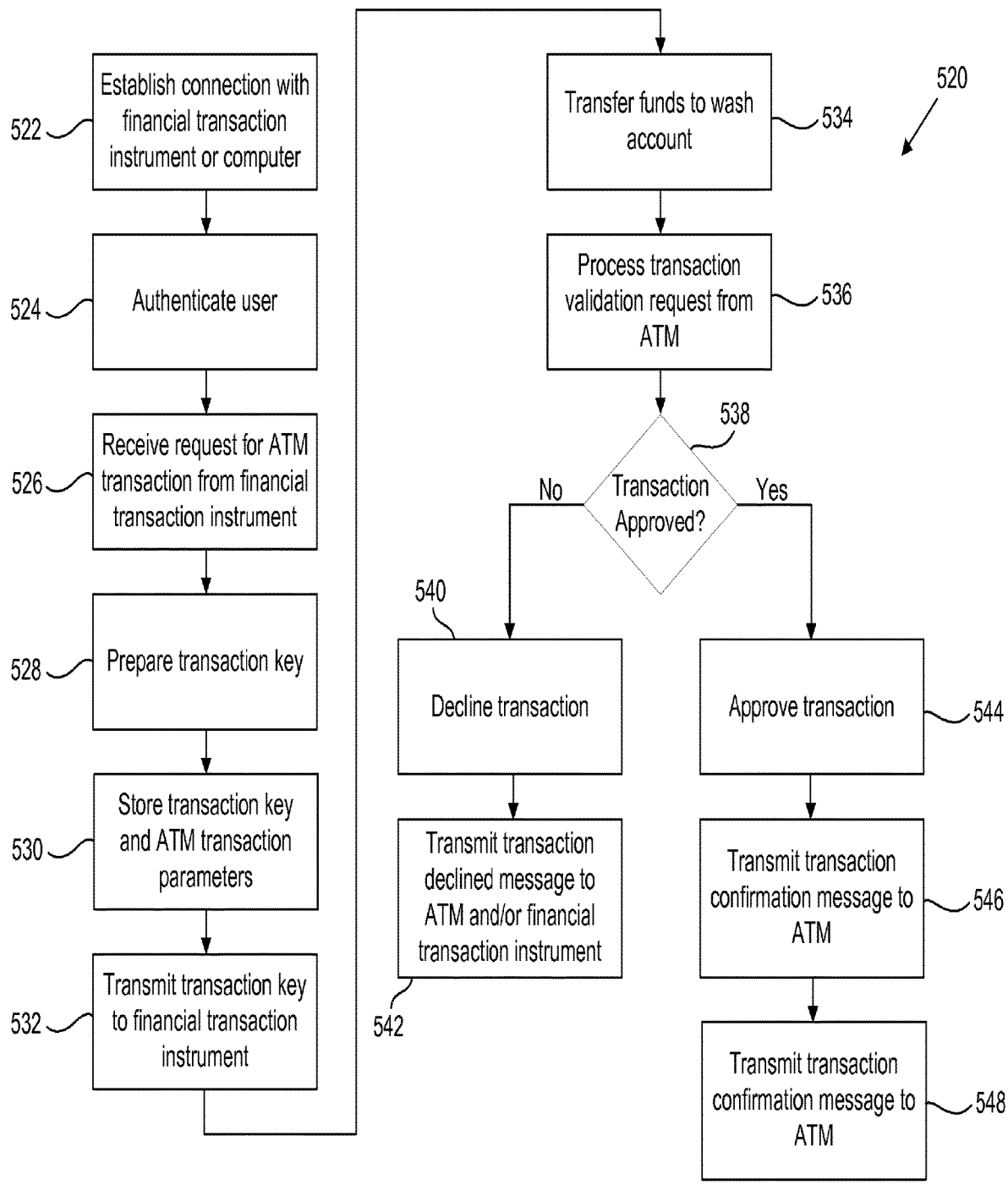
FIG. 5C is a flow chart of one example of the functions performed by a financial institution in accordance with the ATM transaction illustrated in FIG. 5A.

The functions performed by the financial institution during the ATM transaction illustrated in FIG. 5A are shown in FIG. 5C, which is one example of a flow diagram of a method 520 performed by the financial institution. As shown in FIG. 5C, a connection is established with a mobile financial transaction instrument 100 or computer 34, 54 at block 522. The connection with mobile financial transaction instrument 100 or computer 34, 54 may be established using HTTPS or another encrypted communication link. At block 524, FI 20 authenticates the user by confirming that the username or customer number and password received from mobile financial transaction instrument 100 or computer 34, 54 correspond to a user account with the FI 20.

FI 20 receives data defining an ATM transaction from mobile financial transaction instrument 100 or computer 34, 54 at block 526. The data received from mobile financial transaction instrument 100 or computer 34, 54 may include a location of the ATM that will be used for the transaction, the type of transaction that will be performed at the ATM (e.g., withdrawal, deposit, etc.), an amount of the transaction, and a user account that is to be involved in the transaction. One skilled in the art will understand that the data received from mobile financial transaction instrument 100 or computer 34, 54 may include more or less data.

At block 528, FI 20 prepares a single-use AA transaction key for use in the ATM transaction. The single-use AA transaction key may be generated using a random string generator to create an alpha numeric string in which the first several digits may be used to identify the financial institution that generated the transaction key and the remainder of the transaction key may be a random string that does not include any personal account identification information. As described above, some financial institutions may generate AA transaction keys that have one or more portions include data that either identifies or is based on a user's account with the institution. For example, some financial institutions may include the identification data after the prefix, some financial institutions may include the identification data at the end or in the middle of the alpha-numeric string, and some financial institutions may intersperse the identification data at certain locations throughout the alpha-numeric string. The single-use AA transaction key is stored by FI 20 in a data storage unit 26 at block 530 for later use. In some embodiments, FI 20 may also store the parameters received from computer 34, 54 or mobile financial transaction instrument 100 defining the ATM transaction in one or more of data storage units 26 such that the parameters are associated with the single-use AA transaction key and/or an account of the user.

FI 20 transmits a copy of the single-use AA transaction key to mobile financial transaction instrument 100 at block 532. The AA transaction key is transmitted to mobile financial transaction instrument 100 even if a user provides FI 20 with the parameters of the financial transaction using computer 34, 54 since mobile financial transaction instrument 100 is used to carry out the financial transaction. At block 534, FI 20 transfers funds that are to be withdrawn to a wash account if the ATM transaction is a withdrawal.

FI 20 processes a validation request received from ATM 70 at block 536. The validation request includes an ATM-generated PIN and a copy of the AA transaction key, which is used by FI 20 to approve or decline the ATM transaction at block 538. For example, if the validation request received from ATM 70 does not include a single-use AA transaction key that matches a copy of an AA transaction key stored in one or more data storage devices 26, then FI 20 declines the transaction at block 540 and transmits a transaction declined message to mobile financial transaction instrument 100 and/or ATM 70 at block 542. In some embodiments, FI 20 may decline the transaction if the AA transaction key is received after the expiration of the authorized time period for the ATM transaction as defined by the user. FI 20 may compare a time stamp included in the authorization request message received from ATM 70 to a time value stored in a data storage device 26 to determine if the transaction is taking place within the authorized time period. FI 20 may transfer the user's funds from the temporary wash account to the account from which the funds were deducted in the event that the transaction is declined.

If FI 20 determines the transaction should be approved at block 540, then the transaction is approved at block 544. At block 546, FI 20 transmits a transaction confirmation message to ATM 70. FI 20 transmits the ATM-generated PIN to mobile financial transaction instrument 100 at block 548.

Figure 5D:
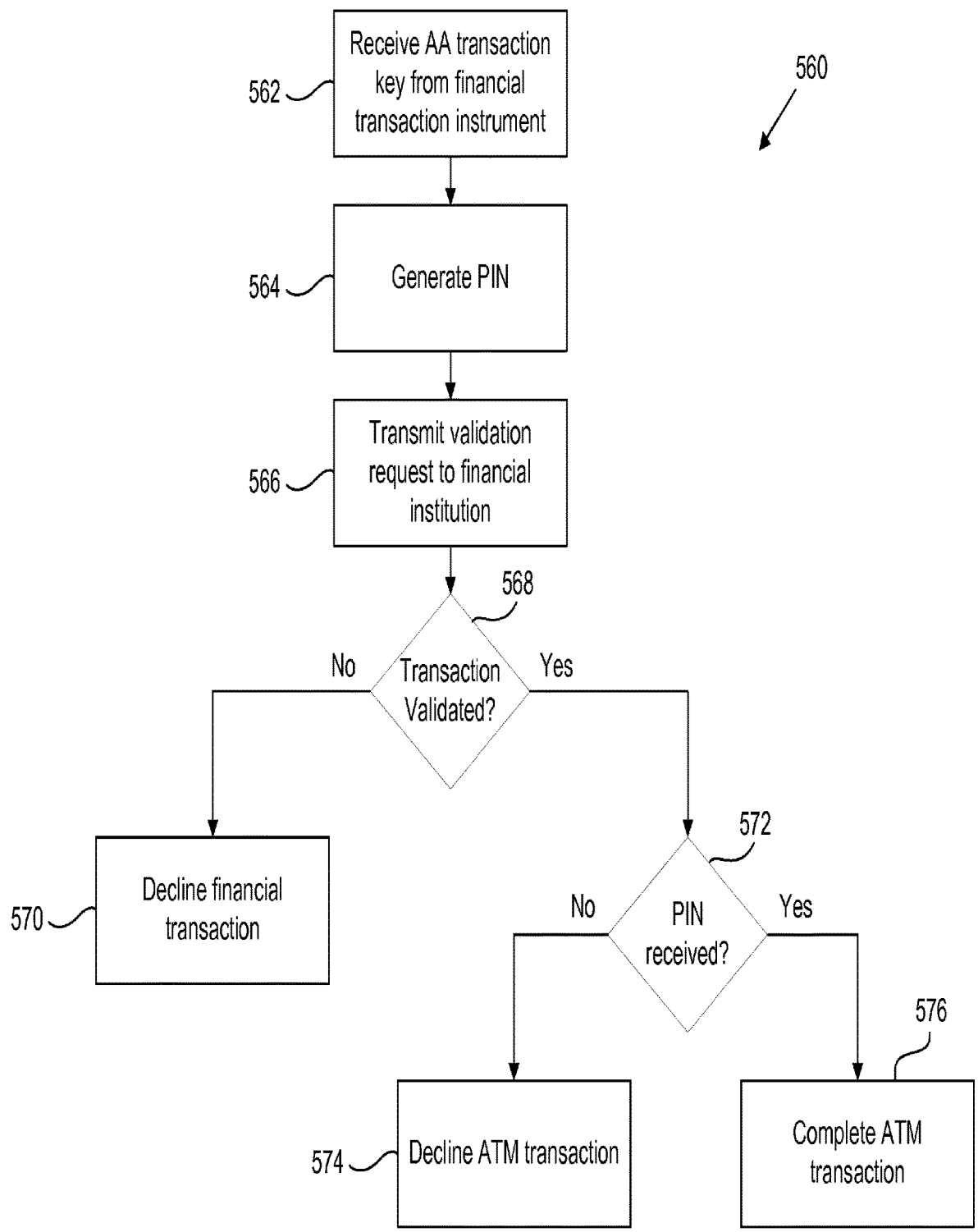
FIG. 5D is a flow chart of one example of the functions performed by an ATM in accordance with the ATM transaction illustrated in FIG. 5A.

FIG. 5D illustrates one example of a method 560 performed by ATM 70 during an ATM transaction in accordance with FIG. 5A. Method 560 begins with ATM 70 receiving a single-use transaction key from mobile financial transaction instrument 100. The transaction key may be received from mobile financial transaction instrument 100 using NFC, Bluetooth, or other wireless transmission protocol when the mobile financial transaction instrument 100 is positioned near ATM 70.

ATM 70 generates a PIN at block 564. The PIN may be generated by a random number generator as will be understood by one skilled in the art. In some embodiments, the PIN is a random number string of approximately four to ten digits. However, one skilled in the art will understand that the PIN may include fewer or more numbers.

ATM 70 may extract the first several characters of the AA transaction key that are used to identify the financial institution that generated the AA transaction key and forward the extracted characters to the AA Registry to identify the financial institution to which the AA transaction key is to be routed. The AA Registry uses the received characters to identify the financial institution that generated the AA transaction key and the contact information (e.g., IP address) for the financial institution. In some embodiments, ATM 70 may have the appropriate contact information for the financial transaction locally stored in a non-volatile computer readable storage medium and thus do not transfer and receive data with the AA Registry.

At block 566, ATM 70 transmits a validation request message to FI 20 over a closed network connection. The validation request message includes the AA transaction key and the PIN generated by ATM 70. In some embodiments, the validation request message may also include additional data added by ATM 70 including, but not limited to, a time stamp, an ATM identifier, or the like.

At decision block 568, ATM 70 received a transaction authorization message from FI 20 and determines if the transaction has been authorized by FI 20. If ATM 70 determines that the transaction has been declined by FI 20, then ATM 70 declines the transaction at block 570. For example, ATM 70 may display a message to the user on display 106 identifying that the transaction has been declined.

If the authorization message received from FI 20 identifies that FI 20 has authorized the transaction, then ATM 70 determines if it has received the ATM-generated PIN from the user or mobile financial transaction instrument 100 at decision block 572. For example, a user may input a PIN using input device 128, which is analyzed by ATM 70 to determine if the input PIN matches a stored copy of the ATM-generated PIN. In some embodiments, ATM 70 may receive a PIN from mobile financial transaction instrument 100 via a wireless communication connection, such as NFC, and compare the received PIN to a stored copy of the ATM-generated PIN to determine if the PINs match.

If the ATM-generated PIN has not been received or if a PIN received from a user or mobile financial transaction instrument 100 does not match the ATM-generated PIN stored in a computer readable storage medium, then ATM 70 declines the transaction at block 574. Declining the transaction may include displaying a message to user on display 106 of ATM 70 or transmitting a message to mobile financial transaction instrument 100 via a wireless transmission protocol that causes a message to be displayed to the user on display 106 of mobile financial transaction instrument 100. ATM 70 may also transmit a message to FI 20 to notify FI 20 that the transaction has been declined by ATM 70.

If ATM 70 receives the ATM-generated PIN via input device 128 of ATM 70 or via a wireless communication connection with mobile financial transaction instrument 100, then ATM 70 completes the ATM transaction at block 576. For example, ATM 70 may dispense the funds to the user if the transaction is a withdrawal and may transmit a message to FI 20 identifying that the transaction has been completed.

Figure 6A:
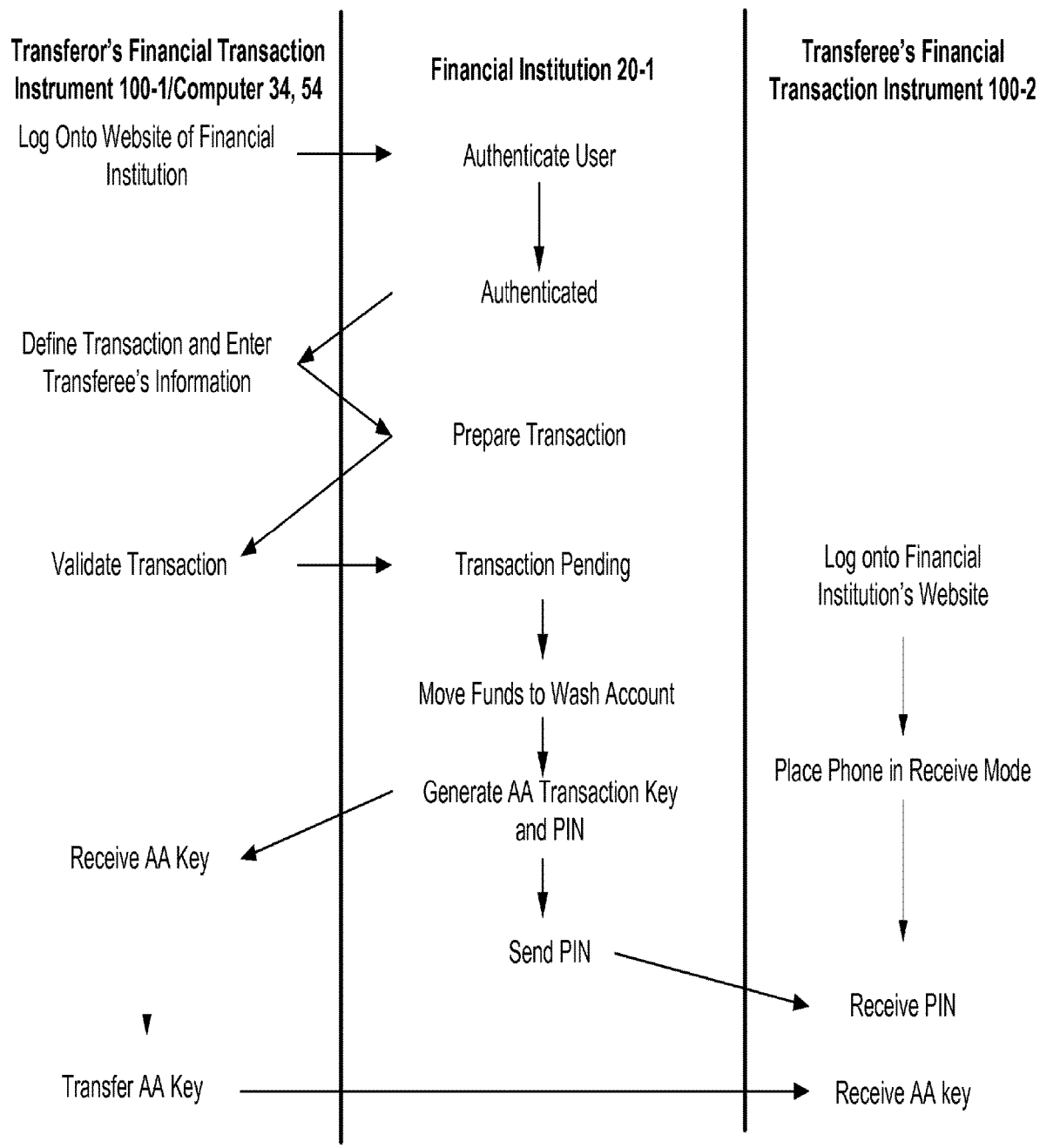
FIGS. 6A and 6B are flow charts of one example of a method of performing a person-to-person transaction using active authentication.
Figure 6B:
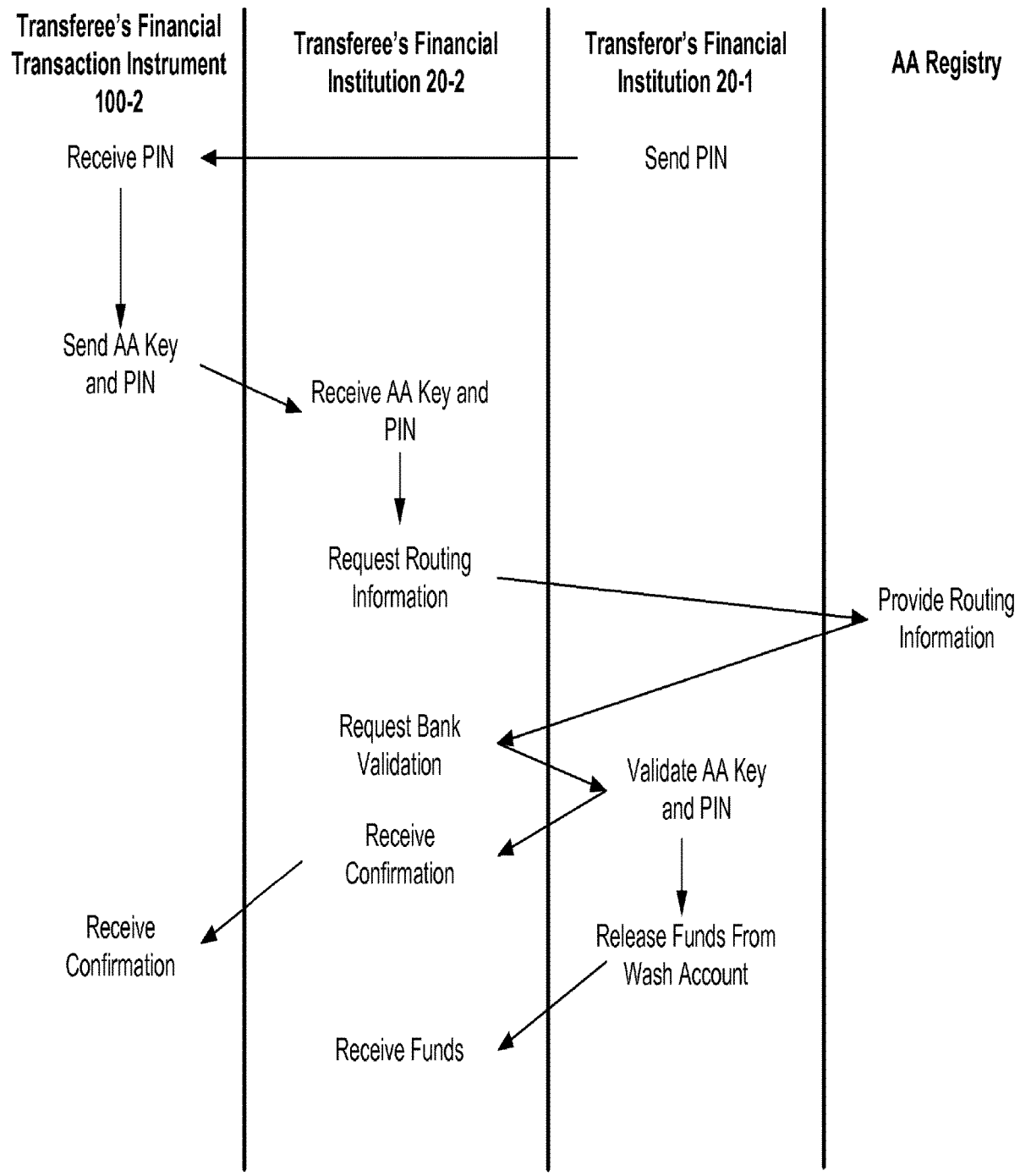

The active authentication may also be used in connection with person-to-person ("P2P") transaction, i.e., a transaction in which funds are transferred from one person's financial institution to the financial institution of another person. In some embodiments, the financial institutions of the person sending the funds ("transferor") is different from the financial institution of the person receiving the funds ("transferee"). In some embodiments, the transferor and the transferee may have accounts with the same financial institution. FIGS. 6A and 6B illustrate the flow of data in a P2P transaction. Referring first to FIG. 6A, a transferor logs onto a website of a financial institution 20-1 at which the transferor has an account. The transferor may log onto the website of FI 20-1 using a browser on a computer 34, 54 or a browser or mobile application installed on a mobile financial transaction instrument 100-1

Mobile financial transaction instrument 100-1 or computer 34, 54 establishes a connection with server 36 on which the F1's website resides using HTTPS or other encrypted communication protocol, and the financial institution's website may authenticate the transferor based on data received from mobile financial transaction instrument 100-1 or computers 34, 54. Such data may include a customer number or user name and password that the user inputs into a GUI 28 displayed on display 106 using an input device 128 as will be understood by those skilled in the art.

Once FI 20-1 authenticates the customer number or user name and associated password, the transferor is provided with a GUI 28 in which the parameters of a P2P transaction may be defined by the transferor. For example, the GUI displayed to the transferor may enable the transferor to identify the amount of the transfer, an account from which the funds are to be transferred, a phone number or other unique identifier of the mobile financial transaction instrument of the transferee (e.g., a MAC address, an IMSI, or ESN), an email address of the transferee, and a time period during which the fund transfer may be performed, to name a few possible data entries.

The transferor's FI 20-1 prepares a fund transfer based on the data provided by the transferor. The GUI 28 provided by FI 20-1 may request the transferor confirm the transaction by utilizing input device 128 of computer 34, 54 or financial transaction input device 100-1. FI 20-1 moves the funds identified by the transferor as being transferred into a wash account in response to the transaction being confirmed by the transferor. FI 20-1 also generates an AA transaction key and a PIN. The AA transaction key may include a plurality of alpha-numeric characters in which the first several alpha-numeric characters identify the financial institution that prepared the AA transaction key and the remaining characters are randomly generated. In some embodiments, the AA transaction key may include one or more portions that either identifies or is based on a user's account with the institution as described above. For example, some financial institutions may include the identification data after the prefix, some financial institutions may include the identification data at the end or in the middle of the alpha-numeric string, and some financial institutions may intersperse the identification data at certain locations throughout the alpha-numeric string. The AA transaction key and PIN are stored in a computer readable storage medium along with the parameters of the P2P transaction received from computer 34, 54 or mobile financial transaction instrument 100-1

F1 20-1 transmits the PIN to the mobile financial transaction instrument 100-2 of the transferee. In some embodiments, the PIN is transmitted from FI 20-i to mobile financial transaction instrument 100-2 via SMS, email, or another data transfer method. FI 20-i also transmits the single-use AA transaction key to the computer 34, 54 or mobile financial transaction instrument 100-1 of the transferor. The AA transaction key may be transmitted via the HTTPS or otherwise encrypted connection between FI 20-1 and computer 34, 54, or mobile financial transaction instrument 100-1 At some time after the transferor has received the single-use AA transaction key from FI 20-1, the transferor transmits the AA transaction key from computer 34, 54 or mobile financial transaction instrument 100-1 to the mobile financial transaction instrument 100-2 of the transferee. In some embodiments, the AA transaction key is wirelessly transferred via NFC, Bluetooth, or other short range wireless protocol. In some embodiments, the transferor may transmit the AA transaction key via email, SMS message, or other data transfer method as will be understood by one skilled in the art.

The P2P transaction continues when the transferee forwards the PIN received from FI 20 of the transferor and the single-use transaction key received from the computer 34, 54 or mobile financial transaction instrument 100 of the transferor to the transferee's financial institution as illustrated in FIG. 6B. The PIN and AA transaction key may be transmitted to the financial institution of the transferee from the mobile financial transaction instrument 100 used by the transferee via an encrypted communication channel such as, for example, HTTPS or the like.

Upon receiving the PIN and AA transaction key from mobile financial transaction instrument 100-2, FI 20-2 may request routing information from the TA Registry. The communication between FI 20-2 and TA Registry may be via an HTTPS or otherwise encrypted communication channel. TA Registry provides FI 20-2 with the appropriate routing information based on the request received from FI 20-2, which may include some or all of the characters of the AA transaction key. In some embodiments, FI 20-2 may have the routing information for the transferor's financial institution locally saved in a non-transient computer readable storage medium from which FI 20-2 may retrieve the routing information.

F1 20-2 receives/retrieves the routing information and transmits the single-use transaction key and PIN, which were stored in data storage devices 26 of FI 20-2, to the transferor's financial institution 20-1 The transferor's financial institution 20-1 validates the single-use AA transaction key and PIN and releases the funds from the wash account. The funds may be transferred from FI 20-1 to FI 20-2 via ACH, account transfer, or other method of fund transfer between financial institutions or within a financial institution as will be understood by one skilled in the art.

Figure 6C:
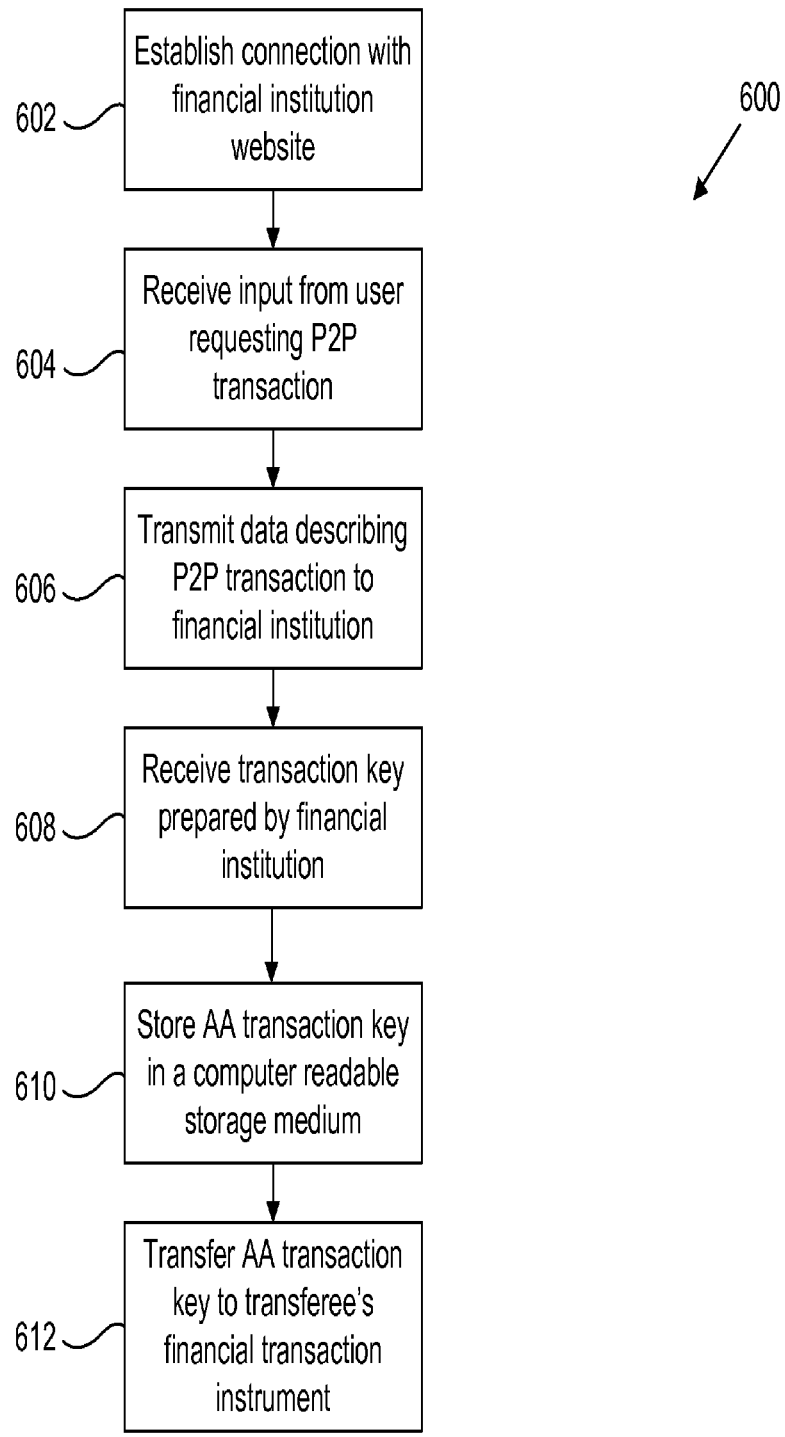
FIG. 6C is a flow chart of one example of the functions performed by a transferor's mobile financial transaction instrument in accordance with the person-to-person transaction illustrated in FIGS. 6A and 6B.

Turning now to the flow chart in FIG. 6C that illustrates one example of the functions performed by computer 34, 54 or mobile financial transaction instrument 100-1 of the transferor during the P2P transaction illustrated in FIGS. 6A and 6B, computer 34, 54 or mobile financial transaction instrument 100-1 establishes a connection with FI 20-1 using an encrypted communication protocol such as HTTPS at block 602. The transferor may access a customer portal 28 of the transferor's financial institution's website where the transferor inputs a username or customer ID along with a password. The access to the website may be provided through a browser on computer 34, 54 or a mobile financial transaction instrument 100-1 or through a mobile application that is downloaded and installed on mobile financial transaction instrument 100-1.

The transferor may use input device 128 to gain access to the appropriate GUI provided by the FI 20 for setting up a financial transaction. Mobile financial transaction instrument 100-1 or computer 34, 54 receives the parameters of the P2P transaction input by the transferor using input device 128 at block 604, which are forwarded from mobile financial transaction instrument 100-1 or computer 34, 54 to the transferor's financial institution at block 606.

At block 608, mobile financial transaction instrument 100-1 or computer 34, 54 receives a unique AA transaction key for the P2P transaction. The unique AA transaction key may be stored in a non-transient computer readable storage medium by computer 34, 54 or mobile financial transaction instrument 100-1 at block 610 for later transfer to the mobile financial transaction instrument 100-2 of the transferee at block 612. The AA transaction key may be transferred from computer 34, 54 or mobile financial transaction instrument 100-1 via a wireless transfer, such as NFC or Bluetooth, or the transfer may be made using another transmission protocol as will be understood by one skilled in the art.

Figure 6D:
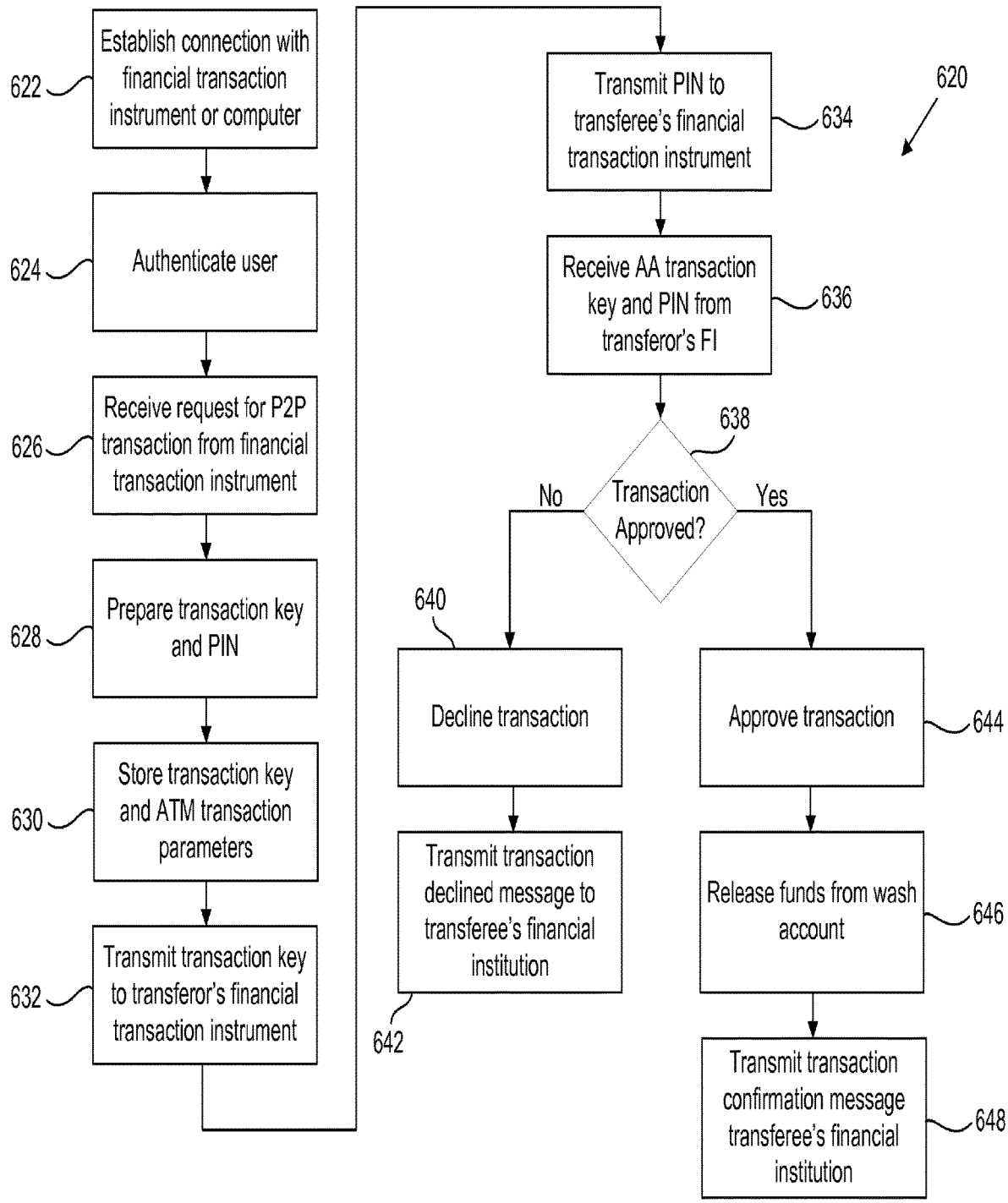
FIG. 6D is a flow chart of one example of the functions performed by the transferor's financial institution during a person-to-person financial transaction in accordance with FIGS. 6A and 6B.

One example of the functions performed by the transferor's financial institution during the P2P transaction illustrated in FIGS. 6A and 6B is shown in FIG. 6D. At block 622, a connection is established with the transferor's mobile financial transaction instrument 100-1 or computer 34, 54. The connection with mobile financial transaction instrument 100-1 or computer 34, 54 may be established using HTTPS or another encrypted communication link. At block 624, FI 20-1 authenticates the user by confirming that the username or customer number and password received from the transferor's mobile financial transaction instrument 100- or computer 34, 54 correspond to the transferor's account with the financial institution.

FI 20-1 receives data defining a P2P transaction from mobile financial transaction instrument 100-1 or computer 34, 54 at block 626. The data received from mobile financial transaction instrument 100-1 or computer 34, 54 may include an amount of the transaction, an account of the transferor that is to be involved in the transaction, and information concerning the transferee including, but not limited to, a phone number or other unique identifier of the mobile financial transaction instrument of the transferee (e.g., MAC address, IMSI, ESN, etc.), an email address of the transferee, and a time period during which the fund transfer may be performed.

The transferor's financial institution 20-1 prepares a unique, single-use AA transaction key and a PIN at block 628. The single-use AA transaction key may be a random alpha-numeric key including one or more values that identify the financial institution that prepared the key. In some embodiments, the AA transaction key may include one or more portions that either identifies or is based on a user's account with the institution as described above. For example, some financial institutions may include the identification data after the prefix, some financial institutions may include the identification data at the end or in the middle of the alpha-numeric string, and some financial institutions may intersperse the identification data at certain locations throughout the alpha-numeric string. At block 630, the PIN and AA transaction key are stored in one or more data storage devices 26 for later use. The transferor's financial institution 20-1 may also store the parameters of the P2P transaction in one or more data storage devices 26 such that the P2P transaction parameters are associated with the PIN and AA transaction key.

At block 632, the AA transaction key is transmitted to the computer 34, 54 or mobile financial transaction instrument 100-1 of the transferor. The single-use AA transaction key may be transmitted to computer 34, 54 of mobile financial transaction instrument 100-1 via a secure internet connection using HTTPS or other encrypted communication channel. The transferor's financial institution 20-1 transmits a PIN to the financial transaction device 100-2 of the transferee at block 634.

At block 636, the transferor's financial institution receives the AA transaction key and PIN number from the transferee's financial institution. The AA transaction key and PIN may be received via an encrypted connection between the financial institutions. The transferor's financial institution determines if the transaction should be approved at decision block 638. Determining if the P2P transaction should be approved may include comparing the AA transaction key and PIN received from the transferee's financial institution to copies of the AA transaction key and PIN stored in one or more of the non-transient data storage devices 26.

If the P2P transaction is declined at block 640, e.g., the AA transaction key and PIN are not valid or have expired, then the transferor's financial institution 20-1 may transmit a transaction declined message to the transferee's financial institution 20-2 at block 642. The transferor's financial institution may also transfer the funds from the wash account back into the transferor's account from which the funds were originally deducted.

If the P2P transaction is approved at block 644, then the transferor's financial institution 20-1 releases the funds from the wash account such that they may be deposited in the account of the transferee at the transferee's financial institution at block 646. At block 648, the transferor's FI 20-1 sends a message to the financial institution of the transferee notifying FI 20-2 that the P2P transaction has been confirmed and the funds are available for transfer. The transfer of funds may be performed using ACH, account transfer, or other form of fund transfer from the transferor's financial institution to the financial institution of the transferee, which may be the same financial institution or different financial institutions as described above.

One example of the functions performed by the mobile financial transaction instrument 100 of the transferee during the P2P transaction illustrated in FIGS. 6A and 6B are set forth in the flow diagram of FIG. 6E. At block 662, the transferee logs onto a website of the transferee's financial institution 20-2 using a browser or mobile application installed on the transferee's mobile financial transaction instrument 100-2. The connection established between mobile financial transaction instrument 100-2 and FI 20-2 may be an encrypted connection using HTTPS or other encryption technique. The mobile financial transaction instrument 100-2 receives an input from transferee at block 664, which results in mobile financial transaction instrument 100-2 being placed in a receive mode. When placed in the receive mode, the mobile financial transaction instrument 100 monitors its wireless transmission interface for a message to be received via a wireless communication protocol such as NFC, Bluetooth, or the like.

At block 666, mobile financial transaction instrument 100-2 receives the PIN from the transferor's FI 20-2. The PIN may be received via SMS, email, or by way of another messaging methodology. Mobile financial transaction instrument 100-2 receives the single-use AA transaction key from the transferor's mobile financial transaction instrument 100-1 at block 668. In some embodiments, the AA transaction key is received from the transferor's financial transaction key 100-1 via NFC, Bluetooth, or other wireless transmission protocol.

The AA transaction key and PIN may be temporarily stored in a non-transient computer readable storage medium, such as main memory 108 and/or secondary memory 110, of mobile financial transaction instrument 100-2 at block 670. At block 672, mobile financial transaction instrument 100-2 transmits the transaction key and PIN to the financial institution of the transferee. The AA transaction key and PIN may be transmitted via a secure connection between mobile financial transaction instrument 100-2 and FI 20-2. For example, the transaction key and PIN may be transmitted using HTTPS or other encrypted communication channel.

At block 674, mobile financial transaction instrument 100-2 receives a message from the transferee's financial institution identifying if the fund transfer was successful. The message received from transferee's FI 20-2 may be displayed to the transferee on display 106 of mobile financial transaction instrument 100-2 as will be understood by one skilled in the art.

A flow chart demonstrating one example of the functions performed by the transferee's financial institution during a P2P transaction in accordance with the one illustrated in FIGS. 6A and 6B is provided in FIG. 6F. A connection is established between transferee's FI 20-2 and the transferee's mobile financial transaction instrument 100-2 at block 682 when the transferee logs onto a website of the transferee's financial institution 20-2 using a browser or mobile application installed on the transferee's mobile financial transaction instrument 100-2. Data is exchanged between FI 20-2 and mobile financial transaction instrument 100-1 via an encrypted connection using HTTPS or other encryption technique.

At block 684, an AA transaction key and PIN are received from the transferee's mobile financial transaction instrument 100-2. The AA transaction key and PIN are received over the encrypted connection between FI 20-2 and mobile financial transaction instrument 100-2. FI 20-2 extracts the AA transaction key and PIN from the message received from mobile financial transaction instrument 100-1 and uses at least some of the received AA transaction key to request routing information from the AA Registry or to retrieve routing information from a non-transient data storage device in order to transmit the transaction key and PIN to the transferor's FI 20-1. For example, FI 20-2 may bifurcate the transaction key such that the first several characters are used for determining the routing information and the remainder of the transaction key is stored in a non-volatile computer readable storage medium.

The characters used for identifying the financial institution that issued the AA transaction key are transmitted to the AA Registry in a message requesting the appropriate routing information for routing the transaction key or is retrieved from the computer readable storage medium at block 686. At block 688, the transferee's financial institution transmits the AA transaction key and PIN to the transferor's financial institution using the routing information received from the AA Registry or retrieved from the storage medium.

A message is received from the transferor's financial institution 20-1 identifying if the transaction has been approved or declined at block 690. The message received from the transferor's financial institution may be received via the same connection as the authorization request message transmitted to FI 20-1 at block 688. The transferee's financial institution transmits a message to the mobile financial transaction instrument 100-2 of the transferee identifying if the transaction has been approved or declined at block 692.

If the transaction is approved by the transferor's financial institution, then transferee's financial institution receives the funds from the transferor's financial institution at block 694. The funds may be received via ACH, account transfer, or other form of fund transfer from the transferor's financial institution to the financial institution of the transferee, which may be the same financial institution or different financial institutions as described above.

The disclosed systems and methods described herein advantageously enable financial transactions to be implemented using unique, single-use AA transaction keys that limit the risk of misappropriation and fraud since the transaction keys do not include static user account information. Consequently, the transmission of data during the financial transaction does not require high-level encryption as the transmitted messages of the transaction do not include personal account information that can be misappropriated and used at a later time for fraudulent transactions. In addition to being used at online and brick-and-mortar merchants, the transaction keys may be used at ATMs as well as for P2P and money wiring transactions.

Although the systems and methods have been described in terms of exemplary embodiments, they are not limited thereto. Rather, the appended claims should be construed broadly, to include other variants and embodiments of the systems and methods, which may be made by those skilled in the art without departing from the scope and range of equivalents of the systems and methods.

What is claimed is:

1. A method of performing a transaction at a point of sale (POS) device, comprising:
   connecting, via a first computer processor associated with a financial institution, with a second computing device being associated with a user being remote from the first computer processor;
   receiving, at the first computer processor, data indicative of a financial transaction from the second computing device, the data comprising parameters associated with the financial transaction;
   generating, using a random number generator associated with the first computer processor, a single-use authentication key associated with the financial transaction, wherein the single-use authentication key is unique for the financial transaction at the POS device and is valid for a limited period of time;
   storing, in data storage associated with the financial institution, the single-use authentication key and the data indicative of the financial transaction;
   sending, from the first computer processor, the single-use authentication key to the second computing device;
   extracting, by the POS device, at least a portion of the single-use authentication key, an internet protocol (IP) address for the POS device, and a merchant identifier (ID) associated with the merchant;
   transmitting, by the POS device and via a network in direct communication with the financial institution, the at least a portion of the single-use authentication key, the IP address, and the merchant ID to the financial institution along with a transaction request associated with the POS device;
   receiving, at the first computer processor, the transaction request from the POS device;
   comparing, via the first computer processor, the transaction request with the data indicative of the financial transaction and the stored single-use authentication key; and
   either:
      approving, with the first computer processor, the transaction request when the transaction request complies with the parameters; or
      declining, with the first computer processor, the transaction when the transaction request does not comply with the parameters.

2. The method of claim 1, wherein the parameters comprise at least one of a merchant type associated with the financial transaction, a specific merchant, or a location of the specific merchant associated with the financial transaction.

3. The method of claim 1, wherein the parameters comprise at least one of a period of time during which the financial transaction is to be completed, a maximum authorized transaction amount, a transaction amount associated with the financial transaction, or a source of the transaction, the source comprising one of a debit transaction or a credit transaction.

4. The method of claim 1, wherein the single-use authentication key comprises a string of digits having a first portion and a second portion, the first portion being associated with and identifying the financial institution, the second portion being a substantially random string generated by the random number generator.

5. The method of claim 1, wherein the single-use authentication key comprises a string of digits having a first portion, a second portion, and a third portion, the first portion being associated with and identifying the financial institution, the second portion being associated with and identifying an account associated with a user of the second computing device, and the third portion being a substantially random string generated by the random number generator.

6. The method of claim 1, further comprising:
receiving, at the first computer processor, a merchant identifier with the transaction request from the POS device;
comparing, with the first computer processor, the merchant identifier with pre-stored identifiers for approved merchants; and
declining, with the first computer processor, the financial transaction when the merchant identifier does not match the pre-stored identifiers.

7. The method of claim 6, wherein the merchant identifier comprises an Internet Protocol (IP) address associated with the POS device.

8. The method of claim 1, further comprising sending, from the first computer processor, a validation request to the second computing device seeking approval of the transaction request.

9. A system for approving a transaction request from a point of sale (POS) device, the system comprising:
one or more processors associated with a financial institution; and
memory in communication with the one or more processors and storing instructions that, when executed by the one or more processors, causes the system to:
connect with a second computing device remote from the one or more processors associated with the financial institution, the second computing device being associated with a user;
receive data indicative of a financial transaction from the second computing device, the data comprising parameters associated with the financial transaction;
generate, using a random number generator associated with the one or more processors, a single-use authentication key associated with the financial transaction, wherein the single-use authentication key is unique for the financial transaction at the POS device and valid for a limited period of time;
store the single-use authentication key and the data indicative of the financial transaction;
send the single-use authentication key to the second computing device;
extract at least a portion of the single-use authentication key, an internet protocol (IP) address for the POS device, and a merchant identifier (ID) associated with the merchant;
receive, via a network in direct communication with the financial institution, a transaction request from the POS device, the transaction request comprising the the at least a portion of the single-use authentication key, the IP address, and the merchant ID;
compare the transaction request with the data indicative of the financial transaction and the stored single-use authentication key; and
either:
approve the transaction request when the transaction request complies with the parameters; or
decline the transaction request when the transaction request does not comply with the parameters.

10. The system of claim 9, wherein the parameters comprise at least one of a merchant type associated with the financial transaction, a specific merchant, or a location of the specific merchant associated with the financial transaction.

11. The system of claim 9, wherein the parameters comprise at least one of a period of time during which the financial transaction is to be completed, a maximum authorized transaction amount, a transaction amount associated with the financial transaction, or a source of the financial transaction, the source comprising one of a debit transaction or a credit transaction.

12. The system of claim 9, wherein the single-use authentication key comprises a string of digits having a first portion and a second portion, the first portion being associated with and identifying the financial institution, the second portion being a substantially random string.

13. The system of claim 9, wherein the single-use authentication key comprises a string of digits having a first portion and a second portion, the first portion being associated with and identifying the financial institution, the second portion being associated with and identifying an account associated with a user of the second computing device.

14. The system of claim 9, wherein the instructions are further configured to cause the system to:
receive a merchant identifier with the transaction request from the POS device;
compare the merchant identifier with pre-stored identifiers for approved merchants; and
decline the financial transaction when the merchant identifier does not match the pre-stored identifiers.

15. The system of claim 14, wherein the merchant identifier comprises an Internet Protocol (IP) address associated with the POS device.

16. The system of claim 9, wherein the instructions are further configured to cause the system to send a validation request to the second computing device seeking approval of the transaction request.

* * * * *